US006600534B1

(12) United States Patent
Tanaka et al.

(10) Patent No.: US 6,600,534 B1
(45) Date of Patent: Jul. 29, 2003

(54) REFLECTIVE LIQUID CRYSTAL DISPLAY DEVICE

(75) Inventors: Kyoushi Tanaka, Osaka (JP); Nobuyoshi Nagashima, Tenri (JP); Toshiaki Fujihara, Higashiosaka (JP); Mariko Ban, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/207,591

(22) Filed: Dec. 8, 1998

(30) Foreign Application Priority Data

Dec. 24, 1997 (JP) .............................. 9-355824
Oct. 20, 1998 (JP) ........................... 10-298967

(51) Int. Cl.⁷ ..................... G02F 1/1335; G02F 1/136
(52) U.S. Cl. ..................................... 349/113; 349/42
(58) Field of Search ............................ 349/113, 38, 42; 357/23.14; 438/116; 257/347

(56) References Cited

U.S. PATENT DOCUMENTS

| | | | | |
|---|---|---|---|---|
| 5,124,769 A | * | 6/1992 | Tanaka et al. ............ | 357/23.14 |
| 5,926,242 A | * | 7/1999 | Kataoka et al. ............ | 349/117 |
| 5,978,056 A | * | 11/1999 | Shintani et al. ............ | 349/137 |
| 6,061,111 A | * | 5/2000 | Kataoka et al. ............ | 349/113 |
| 6,061,112 A | * | 5/2000 | Ukita et al. ............... | 349/113 |
| 6,097,452 A | * | 8/2000 | Shimada et al. ............ | 349/38 |
| 6,100,947 A | * | 8/2000 | Katayama ................. | 349/38 |
| 6,104,460 A | * | 8/2000 | Abe et al. ................. | 349/113 |
| 6,195,140 B1 | * | 2/2001 | Kubo et al. ................ | 349/42 |

FOREIGN PATENT DOCUMENTS

| | | |
|---|---|---|
| JP | 03-002839 | 1/1991 |
| JP | 03-144610 | 6/1991 |
| JP | 3-55985 B2 | 8/1991 |
| JP | 4-73569 B2 | 11/1992 |
| JP | 06-267912 | 9/1994 |
| JP | 06-289423 | 10/1994 |
| JP | 07-064110 | 3/1995 |
| JP | 07-159776 | 6/1995 |
| JP | 07-181517 | 7/1995 |
| JP | 08-122761 | 5/1996 |
| JP | 09-068726 | 3/1997 |
| JP | 09-113936 | 5/1997 |
| JP | 09-152597 | 6/1997 |

* cited by examiner

Primary Examiner—Tarifur Chowdhury
Assistant Examiner—Dung Nguyen
(74) Attorney, Agent, or Firm—Nixon & Vanderhye P.C.

(57) ABSTRACT

A reflective liquid crystal display device is provided in which, on one of a pair of substrates opposed to each other with a liquid crystal layer interposed therebetween, data signal lines and scanning signal lines are provided so as to cross each other, thin film transistors are provided so as to be electrically connected to the data signal lines and the scanning signal lines, reflective pixel electrodes are provided on an interlayer insulator formed so as to cover at least a part of the data signal lines, the scanning signal lines, or the thin film transistors, and the reflective pixel electrodes are electrically connected to drain electrodes of the thin film transistors, wherein an underlying film is disposed in contact with the interlayer insulator, the underlying film uniforming heat conduction and/or light transmittance between the interlayer insulator and the one of the substrates and/or contact properties of the interlayer insulator with respect to the one of the substrates in a region where at least one of the reflective pixel electrodes is formed.

20 Claims, 26 Drawing Sheets

PRIOR ART

223: Semiconductor layer

REFLECTIVE LIQUID CRYSTAL DISPLAY DEVICE

BACKGROUND OF THE INVENTION

1. Field of the Invention

The present invention relates to an active matrix type reflective liquid crystal display device used for a computer, audiovisual (AV) equipment, etc.

2. Description of the Related Art

In general, in an electrode structure of a liquid crystal display device having switching elements, storage capacitance electrodes forming storage capacitance are provided in addition to pixel driving electrodes for driving a liquid crystal layer. In the case where pixel electrodes are provided via an interlayer insulator on a substrate, since the thickness of the interlayer insulator is large, storage capacitance electrodes are provided under the interlayer insulator.

FIGS. 24A and 24B are diagrams showing an exemplary structure of the above-mentioned liquid crystal display device. FIG. 24A is a plan view thereof, and FIG. 24B is a cross-sectional view thereof taken along a line A–A' in FIG. 24A. The liquid crystal-display device shown in these figures is described in Japanese Laid-open Publication No. 9-152625.

Referring to FIGS. 24A and 24B, a thin film transistor (TFT) 24 is provided on a substrate 31. An underlying electrode 25 is formed so as to be connected to a drain electrode 36b of the TFT 24. In the case where the underlying electrode 25 is integrally formed with the drain electrode 36b, the underlying electrode 25 and the drain electrode 36b may be collectively called a drain electrode. An interlayer insulator 38 is formed so as to cover the underlying electrode 25 and the drain electrode 36b. A pixel electrode 21 formed on the interlayer insulator 38 is electrically connected to the underlying electrode 25 or the drain electrode 36b through a contact hole 26. Furthermore, the underlying electrode 25 extends to a central portion of a pixel region 50. A storage capacitance electrode 25a at an end of the underlying electrode 25 is opposed to a storage capacitance line 27. The storage capacitance line 27 is formed under a gate insulating film 33. The gate insulating film 33 covers a gate electrode 32 forming a part of the TFT 24. Storage capacitance is formed in a portion where the storage capacitance line 27 and the storage capacitance electrode 25a are opposed to each other interposing the gate insulating film 33 therebetween. The underlying electrode 25 for forming storage capacitance is provided in a narrow width, except for a portion other than the storage capacitance electrode 25a.

However, in the case where the underlying electrode 25 under the pixel electrode 21 is locally formed in the pixel region 50 (i.e., the underlying electrode 25 is formed in a shape not corresponding to that of the pixel electrode 21), a portion of the interlayer insulator 38 where the underlying electrode 25 is present and a portion of the interlayer insulator 38 where the underlying electrode 25 is not present may be affected in a different manner from each other during a production process. Because of this, the thickness of the resultant interlayer insulator 38 becomes nonuniform, and the pixel electrode 21 may not be formed in a desired shape on the interlayer insulator 38. In the case of a reflective liquid crystal display device, reflective electrodes (pixel electrodes) are not uniformly formed, and irregularities of reflection characteristics are observed. Particularly, in the case where the interlayer insulator 38 is formed so as to have uneven surface by heat treatment during a production process, the difference in thermal conductivity between a portion of the interlayer insulator 38 where the underlying electrode 25 is present and a portion of the interlayer insulator 38 where the underlying electrode 25 is not present is reflected onto the shape of the upper surface of the interlayer insulator 38. This results in display unevenness.

In addition to the above-mentioned problem, there is a possibility that defects are caused in an active matrix substrate having switching elements during a production process. This results in display defects such as line defects, bright points, and flickering. Therefore, in order to enhance production yield, various defect repair techniques have been developed. Mass-production efficiency has been improved by using one of the defect repair techniques or the combination of several kinds of defect repair techniques.

FIG. 25 illustrates the first prior art defect repair technique utilizing a structure of storage capacitance (disclosed in Japanese Publication for Opposition No. No. 4-73569).

The above-mentioned technique is carried out as follows. A MOS-type transistor 208 is turned on by a currently selected scanning signal line 202. A pixel electrode 206 is charged with a signal of a data signal line 201. At this time, as shown in a circuit configuration diagram of FIG. 26, a liquid crystal capacitance 204 and a storage capacitance 205 are charged with a signal of the data signal line 201 through the MOS-type transistor 208. Thus, in the case where the liquid crystal capacitance 204 becomes small and influence of parasitic capacitance becomes large due to miniaturization of a pixel, the liquid crystal capacitance 204 can be compensated by the storage capacitance 205. The liquid crystal layer capacitance 204 is formed between the pixel electrode 206 and a counter electrode (not shown) on a counter substrate which is opposed to the pixel electrode 206 via a liquid crystal layer. On the other hand, the storage capacitance 205 is formed between the pixel electrode 206 and a non-selected scanning signal line 202 interposing a gate insulating film therebetween.

In the case-where pinholes are generated in the gate insulating film in the storage capacitance 205 during a production process, since the pixel electrode 206 overlaps the non-selected scanning signal line 202 via the gate insulating film in the storage capacitance 205, the pixel electrode 206 is electrically connected to the non-selected scanning signal line 202. Therefore, a data signal is not appropriately applied to the pixel electrode 206. In this case, the following extreme defects are caused: the pixel remains in a light-up state, or the pixel does not light up. In order to prevent such defects, the storage capacitance electrode 207 (where the pixel electrode 206 overlaps the scanning signal line 202) could be insulated from the other pixel electrode portions by a slit 210 except for a portion of the storage capacitance electrode 207. Because of this, even in the case where pinholes are generated, a constricted portion provided by the slit 210 is cut with a laser beam during the later correcting step, whereby the storage capacitance electrode 207 is completely insulated from the other pixel electrode portions. Thus, the above-mentioned extreme defects are eliminated, and the pixel is controlled with a signal from the data signal line (i.e., the pixel is driven with a data signal without storage capacitance). As a result, improved effects are obtained.

Referring to FIGS. 27A and 27B, the second prior art technique will be described. In the second prior art technique, line defects, which are caused when a data signal line 201 and a scanning signal line 202 are short-circuited in an MOS-type transistor 208, are corrected (disclosed in Japanese Publication for Opposition No. 3-55985)

A gate electrode 220 branched from the scanning signal line 202 is cut with a laser beam from the scanning signal line 202 along a broken line shown in FIG. 27A. Thereafter, as shown in FIG. 27B, a laser beam is radiated in directions of arrows α and β from above a substrate. Because of this, a source electrode 221 and a drain electrode 222 are short-circuited via the cut gate electrode 220. As a result, an average voltage of a data signal is applied to the pixel electrode 206, whereby the presence of defects may be made unnoticeable.

However, the above-mentioned repair techniques are predicted for a transmission-type liquid crystal display device, and have the following problems.

Firstly, since laser irradiation is conducted in the vicinity of a TFT element, the other films are adversely affected, and repair may not be successful.

Secondly, regarding a pixel without any defect, a voltage which is slightly decreased by a TFT element structure (i.e., parasitic capacitance formed in a portion where a gate electrode overlaps a drain electrode) is applied to a liquid crystal layer corresponding to the pixel without any defect. In contrast, regarding a defective pixel, the source electrode 221 and the drain electrode 222 are short-circuited even after repair of defects, so that a voltage drop caused by the parasitic capacitance is not generated, and a data signal is directly applied to a liquid crystal layer corresponding to the defective pixel. Therefore, particularly in a normally black mode, and a liquid crystal display mode having steep threshold characteristics, even when the identical signal is applied to the pixel without any defects or to the pixel with its defects corrected, optical characteristics of a liquid crystal layer are substantially varied therebetween, depending upon the above-mentioned voltage drop. Accordingly, no substantial effect of the repair of defects is obtained.

SUMMARY OF THE INVENTION

A reflective liquid crystal display device is provided in which, on one of a pair of substrates opposed to each other with a liquid crystal layer interposed therebetween, a plurality of data signal lines for supplying a data signal and a plurality of scanning signal lines for supplying a scanning signal are provided so as to cross each other, a plurality of thin film transistors are provided so as to be electrically connected to the plurality of data signal lines and the plurality of scanning signal lines, a plurality of reflective pixel electrodes are provided on an interlayer insulator formed so as to cover at least a part of the plurality of data signal lines, the plurality of scanning signal lines, or the plurality of thin film transistors, and the plurality of reflective pixel electrodes are electrically connected to drain electrodes of the plurality of thin film transistors through contact holes provided in the interlayer insulator, wherein an underlying film is disposed in contact with the interlayer insulator, the underlying film uniformizing heat conduction and/or light transmittance between the interlayer insulator and the one of the substrates and/or contact properties of the interlayer insulator with respect to the one of the substrates in a region where at least one of the plurality of reflective pixel electrodes is formed.

In one embodiment of the present invention, the underlying film is formed of the drain electrode of the thin film transistor, the drain electrode has a first portion to which a voltage is directly applied from a drain of the thin film transistor, a second portion connected to the first portion and including an electric connecting portion for electrical connection to the reflective pixel electrode via the contact hole, and a third portion to which the voltage is applied via the second portion, and at least one constricted portion of the drain electrode having a narrow width is provided between the first portion and the second portion and between the second portion and the third portion.

In another embodiment of the present invention, the constricted portions are provided so as to be close to the electric connecting portion.

In another embodiment of the present invention, the underlying film is formed of the drain electrode of the thin film transistor, and a ratio of an area of the drain electrode to an area of the reflective pixel electrode is 50% to 95%.

In another embodiment of the present invention, the ratio of an area of the drain electrode to an area of the reflective pixel electrode is 60% to 95%.

In another embodiment of the present invention, the underlying film is formed of the drain electrode of the thin film transistor and at least one island-shaped thin film electrically insulated from the drain electrode, and a ratio of a total area of the drain electrode and the at least one island-shaped thin film to an area of the reflective pixel electrode is 40% to 90%.

In another embodiment of the present invention, the total area of the drain electrode and the at least one island-shaped thin film to an area of the reflective pixel electrode is 50% to 90%.

In another embodiment of the present invention, the drain electrode and the at least one island-shaped thin film are made of the same material.

In another embodiment of the present invention, the underlying film formed in contact with the interlayer insulator is provided so as to correspond to a shape of the reflective pixel electrode to be formed on the interlayer insulator.

In another embodiment of the present invention, at least part of the underlying film is a part of an electrode forming storage capacitance.

Hereinafter, the function of the present invention will be described.

According to the present invention, an underlying film is formed under an interlayer insulator so as to be in contact therewith. The underlying film is formed for the purpose of uniformizing the heat conduction and/or light transmittance between the interlayer insulator and the substrate and/or the contact properties of the interlayer insulator with respect to the substrate, in a region where at least one of a plurality of reflective pixel electrodes is formed. The underlying film can prevent or suppress partial difference in thermal conductivity in the interlayer insulator during the step of forming the interlayer insulator. Because of this, during production of the interlayer insulator on the underlying film, each part is subjected to uniform conditions during each step, and the upper surface of the interlayer insulator can be prescribed to be desirably uneven. This enables a reflective pixel electrode provided on the interlayer insulator to have a desired uneven shape. This prevents reflection characteristics from having irregularities. Furthermore, for example, even in the case where unevenness is formed on the interlayer insulator made of a photosensitive material only by UV-irradiation, the intensity of UV-light and the permeation of a developer are uniformized between a portion of the interlayer insulator under which the underlying film is present and a portion of the interlayer insulator under which the underlying film is not present. Therefore, the reflective pixel electrode becomes unlikely to be varied by the underlying film. Furthermore, even in the case where the upper surface of the interlayer insulator is prescribed to be flat, since the underlying film is formed, the intensity of UV-light and the permeation of a developer are uniformized between a portion of the interlayer insulator under which the underlying film is present and a portion of the interlayer insulator under which the underlying film is not present. Furthermore, the, height at these portions can be aligned, and the thickness of the interlayer insulator in these portions can be made uniform. Therefore, it becomes unlikely that the shape of the reflective pixel electrode will be varied by the underlying film. Furthermore, in the reflective liquid crystal display device of the present invention, the reflective pixel electrode is made of metal or the like, so that the structure of the underlying portion of the pixel electrode does not affect a display. Thus, the inventors of the present invention found the structure of the underlying portion of the pixel electrode which is peculiar to the reflective liquid crystal display device and convenient for correcting a defect.

More specifically, a defect is corrected as follows. As described in the prior art section, a gate electrode is cut from a scanning signal line in accordance with a short-circuited position between the data signal line or the scanning signal line and the drain electrode, and the source electrode and the drain electrode are short-circuited or a predetermined constricted portion is cut in accordance with the short-circuited position.

At this time, when the constricted portion is provided close to an electric connecting portion, a portion close to the electric connecting portion can be cut. Therefore, a short-circuited portion can be prevented from remaining between the constricted portion and the electric connecting portion after repair of a defect. Furthermore, the constricted portion is preferably at least about 6 μm from the electric connecting portion. This is because a positional shift of a contact hole caused during formation thereof is about 3 μm, and a diameter of the area of the interlayer insulator between the drain electrode and the pixel electrode which is irradiated with a laser beam is about 3 μm.

Furthermore, when the underlying film is formed only of the drain electrode, the underlying film which uniformizes the effect on the interlayer insulator can be obtained, without increasing the number of steps of forming a new film. When the ratio of the area of the drain electrode to the area of the reflective pixel electrode is prescribed to be about 50% to about 95%, preferably about 60% to about 95%, it becomes unlikely that a short-circuit will occur between the drain electrode and the surrounding data signal lines.

Furthermore, when the underlying film is formed of the drain electrode and at least one island-shaped thin film electrically insulated from the drain electrode, the shape and arrangement of the underlying film can be flexibly prescribed. Furthermore, when the underlying film is formed in such a manner as to include the drain electrode and the island-shaped thin film electrically insulated therefrom, even in the case where a short-circuit is caused between the drain electrode and the surrounding data signal lines, it is unlikely for the pixel electrode to be affected. Thus, the number of steps of correcting a defective pixel can be decreased, whereby a percentage of satisfactory products can be enhanced. When the total area of the drain electrode and the island-shaped thin film is prescribed to be about 40% to about 90%, more preferably about 50% to about 90% of the area of the reflective pixel electrode, the probability of generation of defective pixels can be decreased without fail.

Furthermore, when the drain electrode and the island-shaped thin film are made of the same material, the drain electrode and the island-shaped thin film can be formed during the same step.

Furthermore, when the underlying film provided in contact with the interlayer insulator is formed so as to correspond to the shape of the reflective pixel electrode on the interlayer insulator, the effect on the interlayer insulator can be uniformized with more reliability.

Even in the case where at least part of the underlying film of the present invention is provided as a part of an electrode which forms storage capacitance, the effect on the interlayer insulator can be uniformized, and large storage capacitance can be secured.

Thus, the invention described herein makes possible the advantages of (1) providing a reflective liquid crystal display device capable of preventing generation of display roughness caused by an underlying electrode locally provided in a pixel region; and (2) providing a reflective liquid crystal display device capable of correcting pixel defects generated during a production process.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative embodiments.

Embodiment 1

Figure 1:
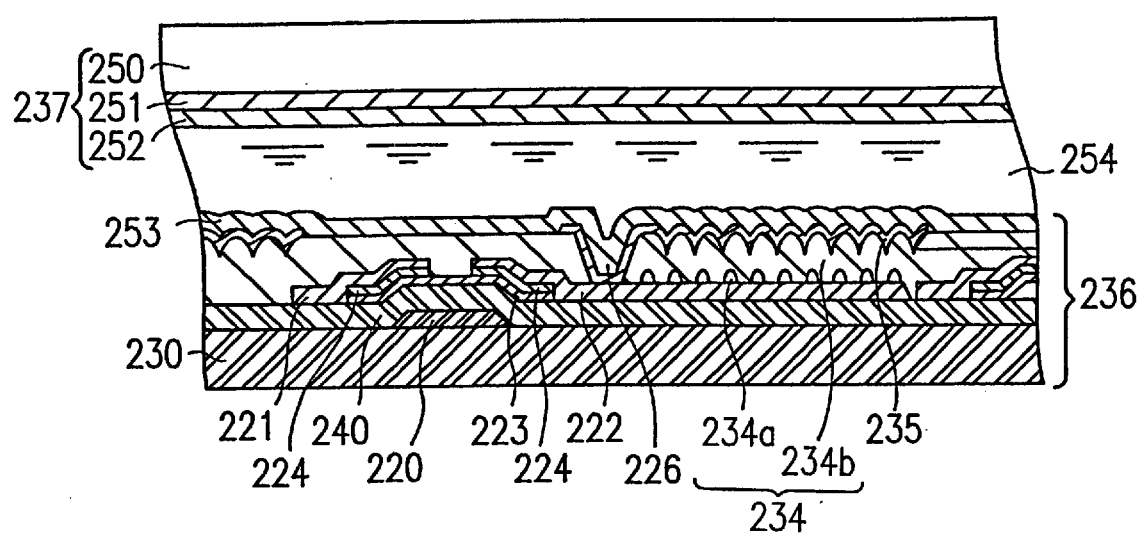
FIG. 1 is a cross-sectional view of a reflective liquid crystal display device in Embodiment 1 of the present invention.
Figure 2:
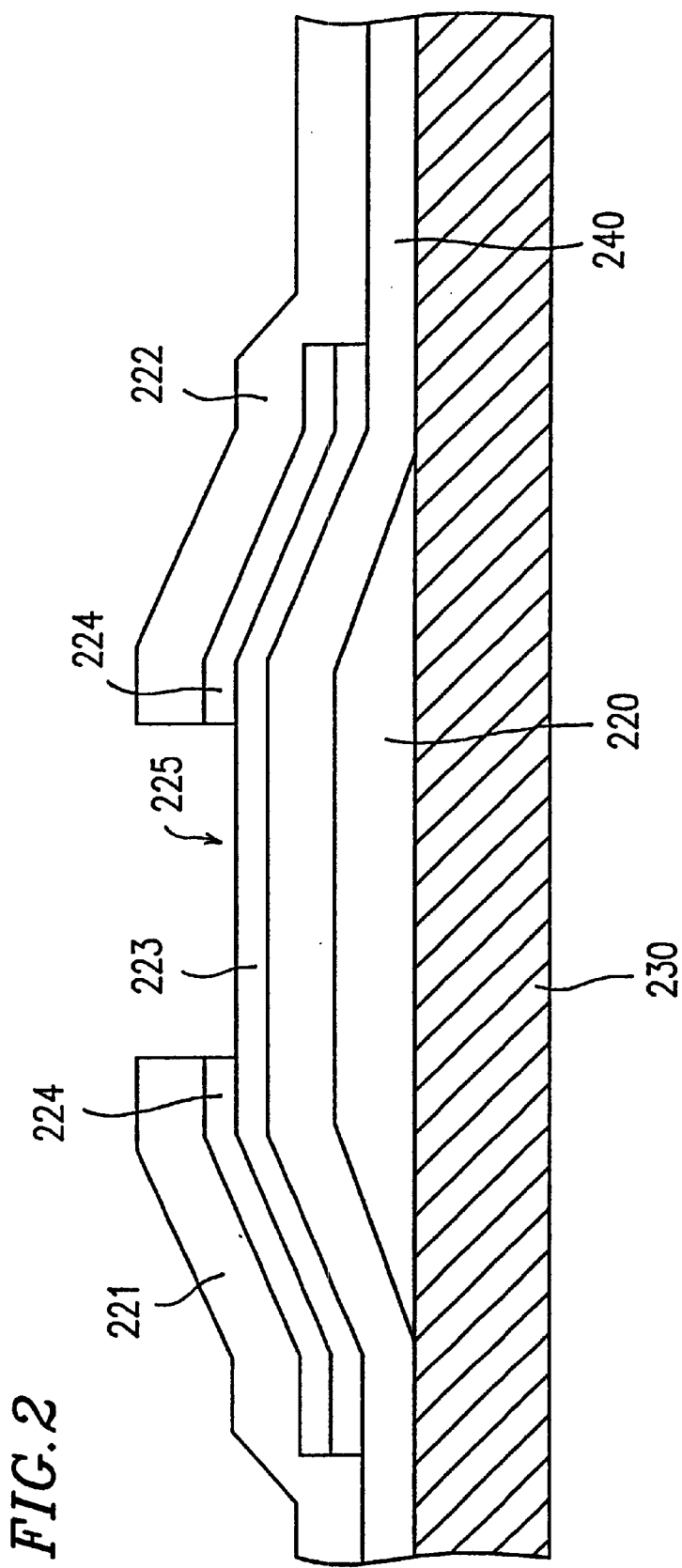
FIG. 2 is a cross-sectional view of an enlarged TFT portion provided in the reflective liquid crystal display device shown in FIG. 1.
Figure 3:
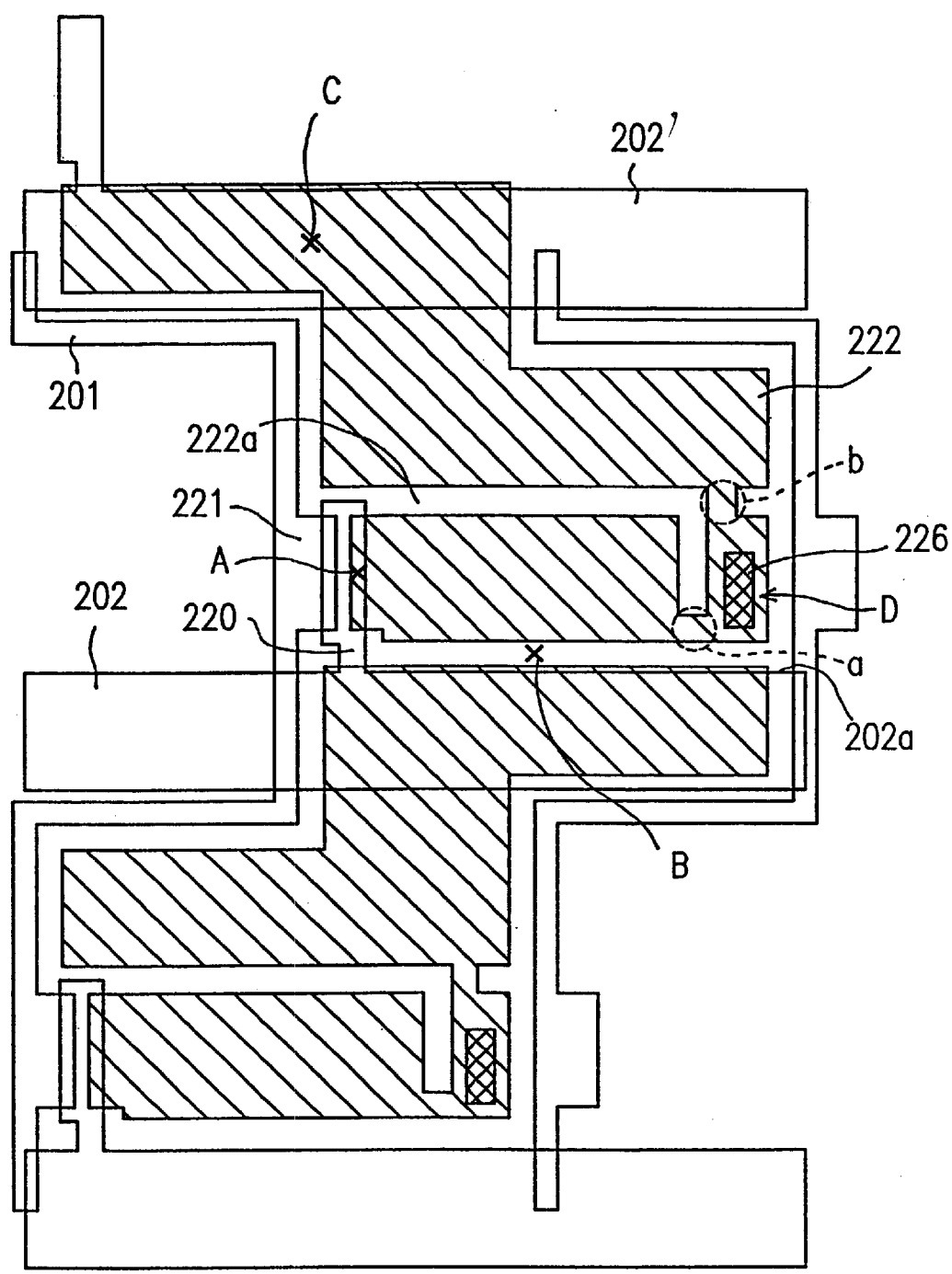
FIG. 3 is a plan view showing TFTs for 2 pixels in a delta arrangement, drain electrodes, data signal lines, and scanning signal lines provided in the reflective liquid crystal display device shown in FIG. 1.
Figure 4:
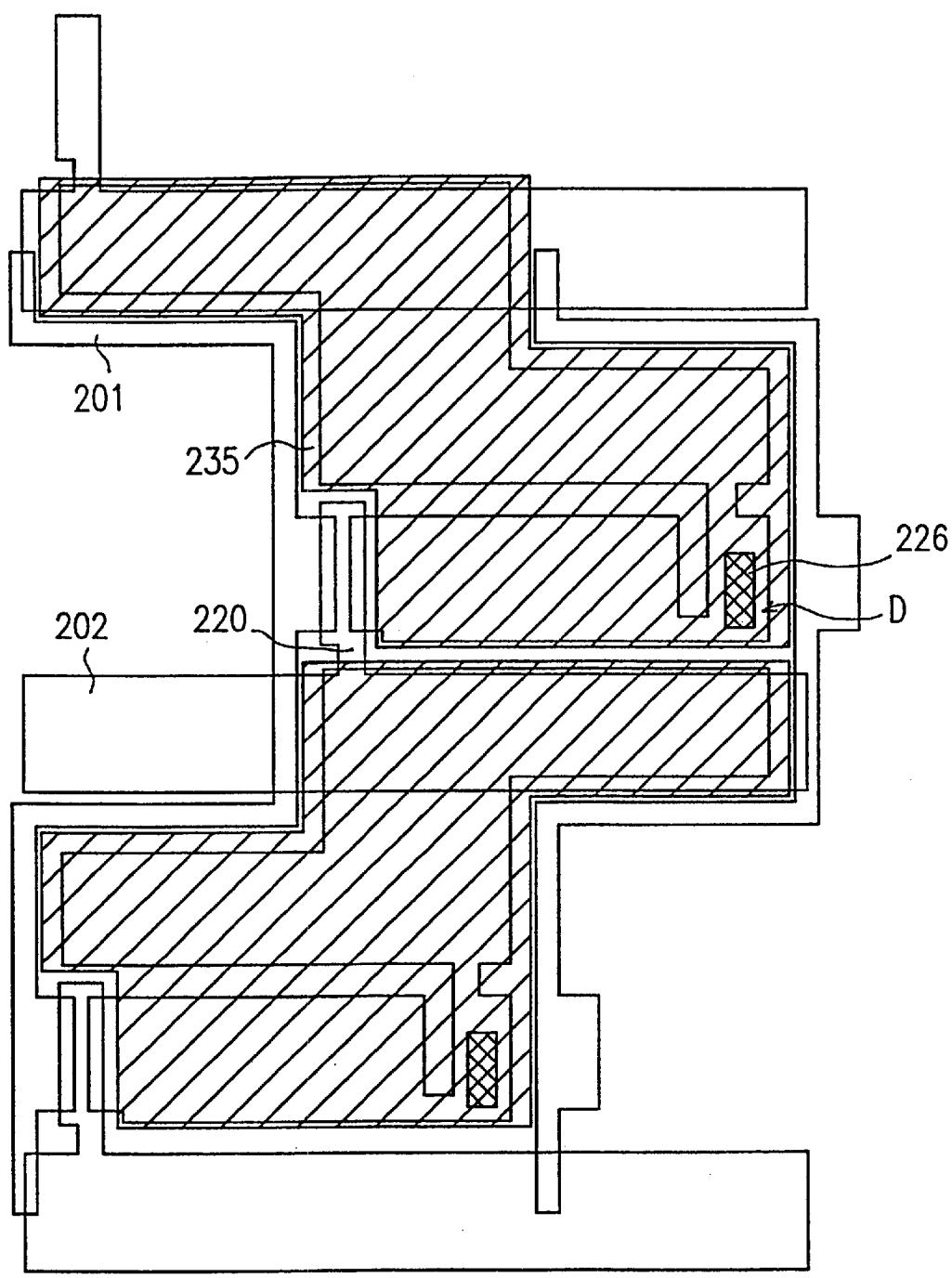
FIG. 4 is a plan view of the reflective liquid crystal display device shown in FIG. 3 further including reflective pixel electrodes.

FIG. 1 is a cross-sectional view of a reflective liquid crystal display device in Embodiment 1 of the present invention. FIG. 2 is a cross-sectional view of an enlarged TFT portion of the reflective liquid crystal display device shown in FIG. 1. FIG. 3 is a plan view showing TFTs for 2 pixels in a delta arrangement, drain electrodes, data signal lines, and scanning signal lines provided in the reflective liquid crystal display device shown in FIG. 1. FIG. 4 is a plan view of the reflective liquid crystal display device shown in FIG. 3 further including reflective pixel electrodes. In the present embodiment, pixels in a delta arrangement which is advantageous for performing a display of a video and a still image will be illustrated.

The reflective liquid crystal display device in the present embodiment is operated in a normally black display mode which performs a black display while no voltage is being applied. As shown in FIG. 1, a pair of substrates, i.e., a first substrate 250 and a second substrate 230 are provided interposing a liquid crystal layer 254 therebetween. A scanning signal line 202 (see FIG. 3) and a gate electrode 220 branched from the scanning signal line 202 are provided on the first substrate 230. A gate insulating film 240 is formed on the scanning signal line 202 and the gate electrode 220 so as to cover the entire surface of the substrate 230.

A semiconductor layer 223 is provided in a TFT portion on the gate insulating film 240, and a contact layer 224 is formed on the semiconductor layer 223 so as to be divided. A source electrode 221 is formed so as to partially overlap one of the divided contact layers 224, and a drain electrode 222 is provided so as to partially overlap the other contact layer 224. The source electrode 221 is provided so as to be branched from a data signal line 201, as shown in FIG. 3. Furthermore, the drain electrode 222 is formed in substantially the same shape and the same size as those of a region defined by a border (upper side) 202a of the scanning signal line 202 and the date signal line 201. More specifically, the drain electrode 222 is not formed only in a portion of a pixel region as in the conventional example, but the drain electrode 222 is formed so as to correspond to the entire pixel region. Herein, since the gate insulating film 240 is present between the drain electrode 222 and the scanning signal line 202, the drain electrode 222 can overlap the scanning signal line 202 as shown in FIG. 3. A storage capacitance portion is formed in an overlapping portion between the drain electrode 222 and a scanning signal line 202' adjacent to the scanning signal line 202 related to the drain electrode 222 (i.e., between the drain electrode 222 and the scanning signal line 202' to which a gate signal is sent immediately before the scanning signal line 202 related to the drain electrode 222). This storage capacitance portion has a so-called Cs On Gate structure. On the other hand, the drain electrode 222 and the data signal line 201 are formed at the same height during the same step, so that a gap is provided therebetween to prevent a short-circuit.

Referring to FIG. 1, an interlayer insulator 234 partially having an uneven upper surface is formed substantially over the entire substrate. A contact hole 226 is provided in the interlayer insulator 234 on the drain electrode 222. In the present embodiment, the interlayer insulator 234 includes an uneven portion 234a and an insulating film 234b covering the uneven portion 234a. In another embodiment, the interlayer insulator 234 may be formed of one interlayer insulator having unevenness. The uneven portion 234a is provided for the purpose of preventing a reflective pixel electrode 235 from having a mirror surface to completely and regularly reflect light from outside a display device, and for the purpose of giving some unevenness to the reflective pixel electrode 235 to cause diffusing reflection. The reflective pixel electrode 235 with unevenness is provided on the interlayer insulator 234, and a part of the reflective pixel electrode 235 is embedded in the contact hole 226 to be electrically connected to the drain electrode 222.

FIG. 4 shows regions where the reflective pixel electrodes 235 are formed. As is understood from FIG. 4, the drain electrode 222 is formed in almost the entire region above which the reflective pixel electrode 235 is formed. More specifically, the drain electrode 222 in the present embodiment can be considered as an underlying film provided in almost the entire region of the interlayer insulator 234 where at least the reflective pixel electrode 235 is formed thereon. The drain electrode 222 is formed to be larger as compared with the conventional example, whereby the drain electrode 222 can be used as the underlying film for the interlayer insulator 234. An alignment film 253 for controlling an alignment state of liquid crystal molecules is formed on the reflective pixel electrode 235.

Regions shown in FIGS. 3 and 4 correspond to 2 pixels. In the present embodiment, pixels are arranged in a delta arrangement including a plurality of the regions shown in FIG. 3 or 4 as one unit, whereby an active matrix substrate 236 is produced.

On the second substrate 250 provided so as to be opposed to the first substrate 230 with the liquid crystal layer 254 interposed therebetween, a transparent electrode 251 made of, for example, indium tin oxide (ITO) is provided as a counter electrode. An alignment film 252 is formed on the transparent electrode 251. The substrate in this state is referred to as a counter substrate 237.

The steps of producing the active matrix substrate 236 in the reflective liquid crystal display device in Embodiment 1 thus constructed will be described with reference to FIGS. 2, 5A–F, and 6.

First, the steps of producing the TFT shown in FIG. 2 will be described.

A Ta film is formed to a thickness of about 500 nm on the substrate 230 made of glass or the like, for example, by sputtering. The Ta film is patterned by photolithography, whereby the scanning signal line 202 and the gate electrode 220 are formed.

Next, thin films made of the following materials are formed by using, for example, a plasma CVD method and patterning, whereby the gate insulating film 240, the semiconductor layer 223, and the contact layer 224 are formed. The respective materials are $SiN_x$, Amorphous Si, and N+ amorphous Si, and the respective thicknesses are about 300 nm, about 100 nm, and about 80 nm. The gate insulating film 240 is removed at a bus-line terminal portion, for example, in the periphery of a display portion of the device, whereby the bus-line terminal portion can be brought into contact with the scanning signal line 202.

Then, a thin film of Ta is formed by sputtering and patterning, whereby the data signal line 201, the source electrode 221, and the drain electrode 222 are formed. At this time, the drain electrode 222 is formed so as to have a shape shown in FIG. 3.

Next, a portion 225 of the contact layer 224 in a channel portion of the TFT (between the source electrode 221 and the drain electrode 222) is removed by etching or the like, whereby the TFT as shown in FIG. 2 is completed.

Figure 5A:
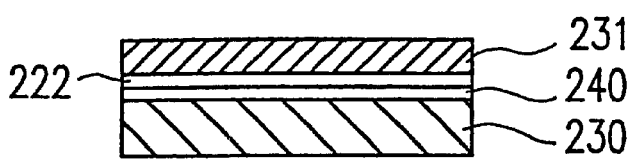
FIGS. 5A through 5F are cross-sectional views showing the steps of forming an interlayer insulator in the reflective liquid crystal display device shown in FIG. 1.

Hereinafter, the steps of forming the reflective pixel electrode 235 will be described with reference to FIGS. 5A through 5F and 6. As shown in FIG. 5A, a resist material is spin-coated onto the drain electrode 222 by using, for example, positive OFPR-800 (produced by Tokyo Ohka Kogyo Co., Ltd.) at about 500 r.p.m. to about 3000 r.p.m. In the present embodiment, the resist material is coated at about 2000 r.p.m. for about 30 seconds, whereby a resist film 231 is formed to a thickness of about 1.0 µm.

The resultant layered structure is pre-baked by a hot plate for about 30 seconds.

Figure 5B:
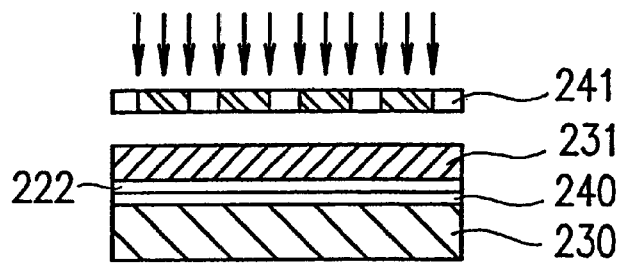
Figure 6:
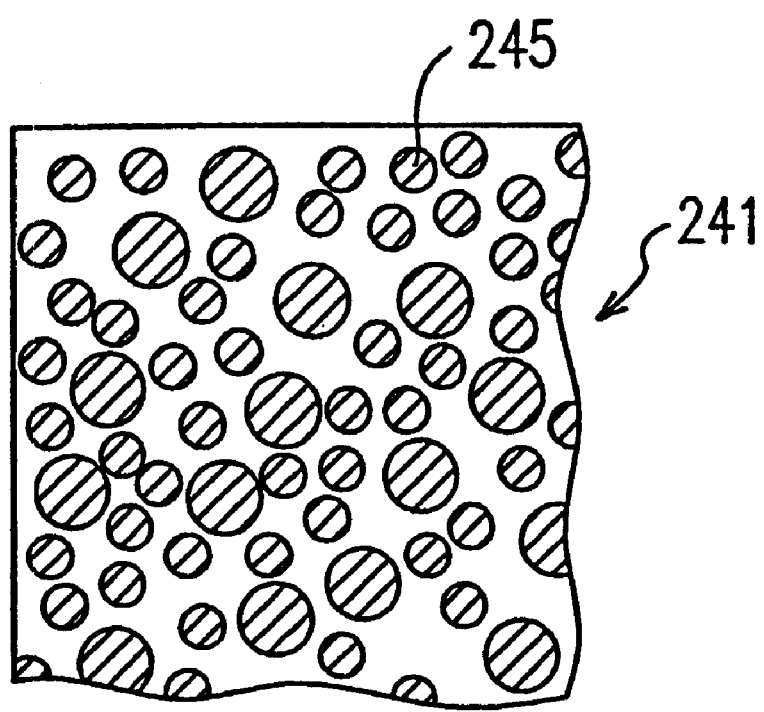
FIG. 6 is a plan view showing a photomask used for forming the interlayer insulator in the reflective liquid crystal display device shown in FIG. 1.

Next, a photomask 241 with circular light-blocking portions 245 positioned at random and having the random size as shown in FIG. 6 is disposed in parallel with the substrate 230 as shown in FIG. 5B, under which condition the resist film 231 is exposed to light.

Figure 5C:
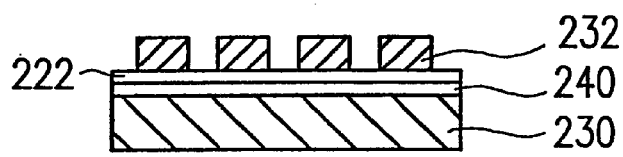

Then, the resist film 231 is developed, and convex portions 232 as shown in FIG. 5C corresponding to the circular light-blocking portions 245 are formed. As a developer, NMD-3 (2.38%) produced by Tokyo Ohka Kogyo Co., Ltd. is used.

Figure 5D:
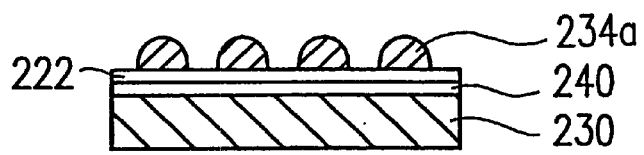

As shown in FIG. 5D, the convex portions 232 are heat-treated at about 120° C. to about 250° C., followed by heat curing, to obtain the uneven portion 234a including smooth convex portions. In the present embodiment, the heat treatment is conducted at about 250° C. for about 30 minutes.

Figure 5E:
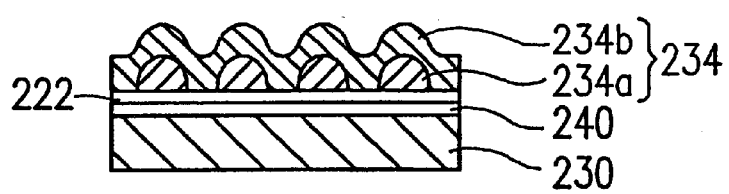

Next, as shown in FIG. 5E, the insulating film 234b is formed on the uneven portion 234a. The insulating film 234b is formed by spin-coating a resist material (for example, OFPR-800 (produced by Tokyo Ohka Kogyo Co., Ltd.) preferably at about 500 r.p.m. to about 3000 r.p.m. In the present embodiment, the resist material is coated to a thickness of about 0.7 µm at about 2500 r.p.m. for about 30 seconds, and heat-treated at about 250° C. for about 30 minutes, followed by heat deformation and heat curing, in the same way as in the steps of forming the uneven portion 234a.

The interlayer insulator 234 (including the uneven portion 234a and the insulating film 234b) is patterned by light exposure and development, whereby the contact hole 226 is formed on the drain electrode 222, and a contact hole (not shown) is formed in the interlayer insulator 234 at the terminal portion.

Figure 5F:
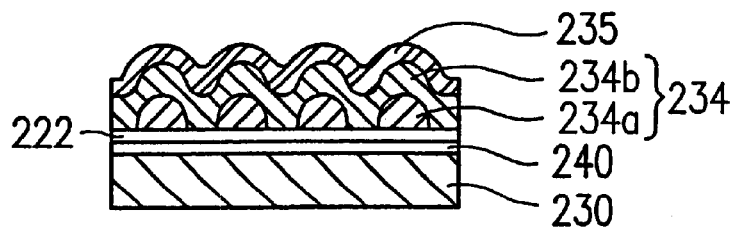

As shown in FIG. 5F, the reflective pixel electrode 235 made of a metal thin film is formed on the interlayer insulator 234. As the metal thin film, Al, Ni, Cr, Ag, or the like can be used. Thickness of the metal thin film is suitably in the range of about 0.01 µm to about 1.0 µm. In the present embodiment, Al is deposited by vacuum deposition, whereby the reflective pixel electrode 235 shown in FIG. 4 as a plan view is formed. Polyimide is coated onto the reflective pixel electrode 235, followed by baking, whereby the alignment film 253 is formed. As described above, the active matrix substrate 236 is completed.

The counter substrate 237 is produced as follows.

The transparent electrode 251 made of ITO is formed to a thickness of about 1000 Å on the second substrate 250 shown in FIG. 1. Polyimide is coated onto the transparent electrode 251 and baked, whereby the alignment film 252 is formed. The transparent electrode 251 and the alignment film 252 can be formed by a known technique.

Next, for example, an adhesive sealant mixed with spacers having a diameter of 7 µm is screen-printed onto one of the active matrix substrate 236 and the counter substrate 237. Thereafter, both the substrates are attached to each other so as to form a gap in which liquid crystal material is filled. This gap is deaerated in a vacuum, whereby the liquid crystal material is injected into the gap to form the liquid crystal layer 254 and then the gap is sealed. As the liquid crystal material, for example, guest-host liquid crystal (ZLI 4792 produced by Merck & Co., Inc.) containing a black dye, mixed with 4.5% of an optically active material (S811, produced by Merck & Co., Inc.) is used. The completed reflective liquid crystal display device is operated in a normally black display mode.

Thus, in the reflective liquid crystal display device of the present embodiment, as described above, the drain electrode 222 is formed in substantially the same shape and the same size as those of the region surrounded by the upper side 202a of the scanning signal line 202 and the data signal line 201, as shown in FIG. 3. In other words, the size of the drain electrode 222 is substantially matched with that of the reflective pixel electrode 235. For example, in the present embodiment, a 2.5-inch reflective liquid crystal display device is produced, the maximum ratio of the drain electrode 222 to the reflective pixel electrode 235 is set to be 80.7%. The maximum ratio of the drain electrode 222 depends upon the pixel size, the minimum space between the data signal line 201 and the drain electrode 222, and the minimum space between the drain electrodes 222, which are limited by process precision.

As described above, since the shape of the drain electrode 222 is formed so as to correspond to that of the reflective pixel electrode 235, partial difference in thermal conductivity in the interlayer insulator 234 on the drain electrode 222 can be prevented or suppressed, when it is formed as described above. In other words, in the present embodiment, the drain electrode 222 is formed as an underlying film, substantially over the entire region of the interlayer insulator 234 where at least the reflective pixel electrode 235 is formed. Therefore, heat can be more uniformly applied to the uneven portion 234a and the insulating film 234b during the above-mentioned heat treatment. As a result, the thermal conductivity of each portion during the production of the interlayer insulator 234 is made uniform, and the upper surface of the interlayer insulator 234 can have a desired uneven shape. This allows the reflective pixel electrode 235 provided on the interlayer insulator 234 to have a desired uneven shape, preventing reflection characteristics from having irregularities. The reflective pixel electrode 235 is formed of a reflective member, so that even when the area of the drain electrode 222 to be the underlying film becomes large, the aperture ratio of the liquid crystal display device is not decreased.

In order to obtain the effect as described above, the ratio of the area of the drain electrode 222 to that of the reflective pixel electrode 235 is preferably set to be about 50% to about 95%, more preferably about 60% to about 95%.

In the present embodiment, the effect of the underlying film (i.e., the drain electrode 222) on the interlayer insulator 234 has been described in terms of heat conduction. For example, in the case where the interlayer insulator 234 is made of photosensitive resin, since the drain electrode 222 as the underlying film is provided so as to correspond to the reflective pixel electrode 235 in the present embodiment, the interlayer insulator 234 made of photosensitive resin can be uniformly cured. Furthermore, in the present embodiment, the interlayer insulator 234 is formed on the drain electrode 222 with uniform contact properties, so that the interlayer insulator 234 can be prevented from being nonuniformly formed due to permeation of an etchant or the like.

Furthermore, the drain electrode 222 is formed as shown in FIG. 3. More specifically, the shape of the drain electrode 222 is determined by an electrode nonformed portion 222a. The electrode non-formed portion 222a extends from a part of an outer edge of the pixel region, which corresponds to the region where the reflective pixel electrode 235 as shown in FIG. 5 is present, to the inside of the pixel region. Because of the portion 222a, the drain electrode 222 forms one conductive path. The contact hole 226 is disposed in the middle of the conductive path of the drain electrode 222. The reflective pixel electrode 235 is electrically connected to the drain electrode 222 through the contact hole 226. A portion of the electrical connection is referred to as an electric connecting portion D. Thus, in the present embodiment, it is considered that the drain electrode 222 forms one conductive path having the electric connecting portion D in the middle thereof. On the conductive path upstream side (i.e., the TFT side) of the electric connecting portion D and the conductive path downstream side of the electric connecting portion D, constricted portions a and b with narrow widths defined by the portion 222a and the outer edge of the drain electrode 222 are provided. The drain electrode 222 in the present embodiment forms a conductive path through which a voltage supplied from a drain of a TFT (i.e., an end portion of a drain electrode opposed to a source electrode) is sent to the electric connecting portion D through the constricted portion a, supplied to the reflective pixel electrode 235 in the electric connecting portion D, and supplied, through the constricted portion b, to a region (storage capacitance portion) where the drain electrode 222 overlaps the scanning signal line 202. More specifically, the constricted portions a and b can be considered as portions where the conductive path formed of the drain electrode 222 becomes narrow. In other words, the drain electrode has a first portion to which a voltage is directly applied from a drain of the thin film transistor, a second portion connected to the first portion and including an electric connecting portion for electrical connection to the reflective pixel electrode via the contact hole, and a third portion to which the voltage is applied via the second portion. At least one constricted portion of the drain electrode having a narrow width is provided between the first portion and the second portion and between the second portion and the third portion. Two or more constricted portions may be provided on the conductive path upstream side and on the conductive path downstream side of the electric connecting portion D, respectively.

Because of the drain electrode 222 as described above, even when a defect is found in the reflective liquid crystal display device during the inspection step, the defect can be corrected as follows. A method for correcting a defect is shown in the following Table 1. The reflective liquid crystal display device in the present embodiment is operated in a normally black mode, so that repair is made in accordance with a place of a defect, as shown in the "Normally black" section in Table 1.

TABLE 1

Method for correcting each defect

| Display mode | Place of a defect | | Cutting portion | Method for correcting a defect (X̸) |
|---|---|---|---|---|
| Normally black | TFT portion | A | a is cut | Not conducted |
| | Upstream side (other than a TFT portion) | B | a is cut | Not conducted |

TABLE 1-continued

| | | | | |
|---|---|---|---|---|
| | Downstream side | C | b is cut | Not conducted |
| | TFT portion + Downstream side | A + C | a and b are cut | Not conducted |
| | Upstream side (other than a TFT portion) + Downstream side | B + C | a and b are cut | Not conducted |
| Normally white | TFT portion | A | — | Conducted |
| | Upstream side (other than a TFT portion) | B | Defective place is cut | Not conducted |
| | Downstream side | C | b is cut | Not conducted |
| | TFT portion + Downstream side | A + C | b is cut | Conducted |
| | Upstream side (other than a TFT portion) + Downstream side | B + C | Defective place and b are cut | Not conducted |

※In a TFT portion, a gate electrode is cut from a scanning signal line, and a source electrode and a drain electrode are short-circuited.

{ A: A gate electrode and a drain electrode are short-circuited.
B: A drain electrode and an adjacent drain electrode are short-circuited.
C: A drain electrode and a scanning signal line (or a common line) are short-circuited.

As shown in FIG. 3, in the case where the gate electrode 221 and the drain electrode 222 are short-circuited at a point A of the TFT portion, and the TFT is not operated normally, the constricted portion a on the upstream side is cut. Because of this, the reflective pixel electrode 235 is insulated from the drain electrode 222 so as to be in a floating state, whereby the non-lighting reflective pixel electrode 235 makes a defect unnoticeable.

Furthermore, in the case where two adjacent drain electrodes 222 are short-circuited at a point B on the conductive path upstream side (except for the TFT portion) of the electric connecting portion D, the constricted portion a is similarly cut. Furthermore, in the case where the drain electrode 222 and the scanning signal line 202 are short-circuited at a point C on the conductive path downstream side of the electric connecting portion D, the constricted portion b is cut. Furthermore, in the case where the point A of the TFT portion and the point C on the downstream side are both short-circuited, in the case where the point B on the upstream side and the point C on the downstream side are both short-circuited, and in the case where the points A, B, and C are all short-circuited, both the constricted portions a and b are cut.

A defect found during the inspection step is corrected by irradiating a laser beam to the constricted portion a or b, so that defects adversely affecting the display characteristics such as line defects and bright points are not displayed, and mass-production efficiency of the reflective liquid crystal display device can be enhanced. Furthermore, in the case where the electric connecting portion D and the constricted portions a and b are disposed at a position between two switching elements (TFTs) adjacent in the right and left direction at a distance from the respective TFTs, formation of a contact hole and laser irradiation are likely to be performed without affecting the TFTs. Therefore, the efficiency of repair can be enhanced. "Method for correcting a defect" in Table 1 refers to a method for cutting a gate electrode from a scanning signal line at a TFT portion, thereby short-circuiting a source electrode and a drain electrode as described in a conventional example in Japanese Publication for Opposition No. 3-55985. This method is not conducted with respect to the reflective liquid crystal display device in the present embodiment which is operated in a normally black mode.

Figure 7:
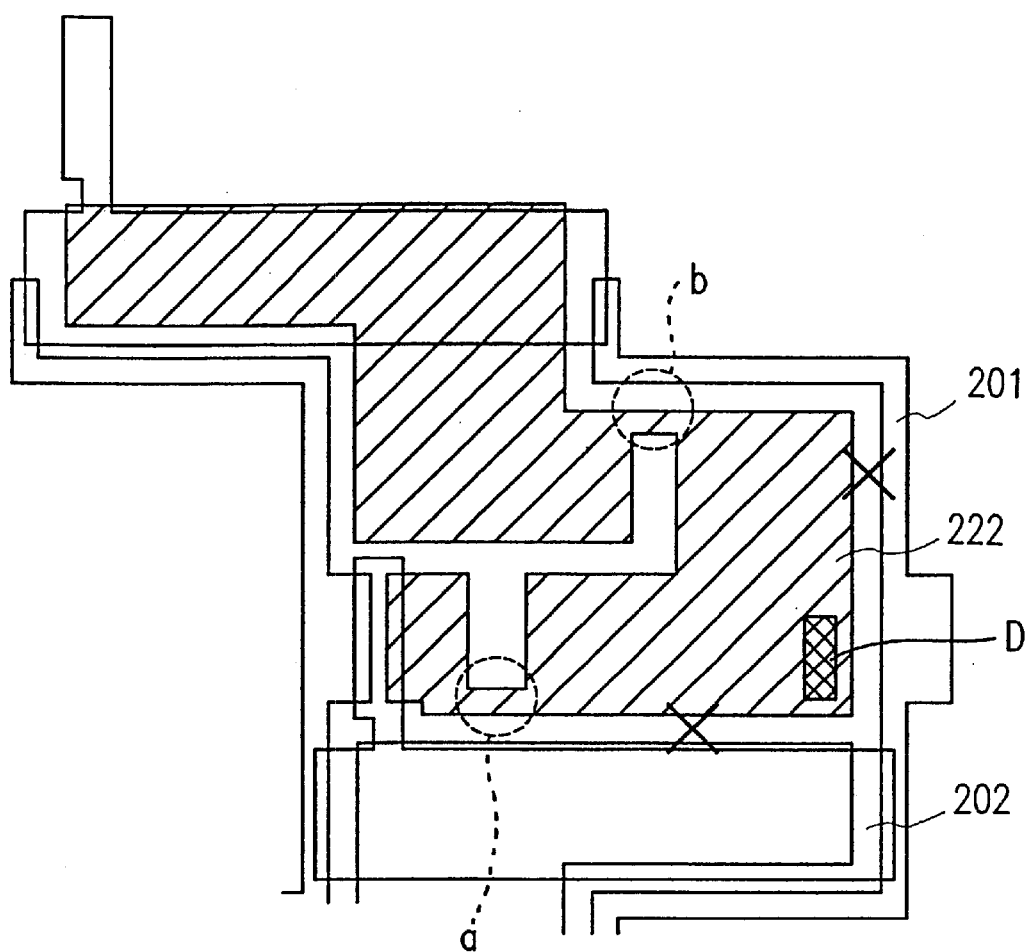
FIG. 7 is a plan view showing a reflective liquid crystal display device with another structure to which the present invention is applicable, compared with the reflective liquid crystal display device shown in FIG. 1.

It is preferable that the constricted portions a and b provided interposing the electric connecting portion D are placed at positions closer to the electric connecting portion D for the following reason. As shown in FIG. 7, in the case where the constricted portions a and b are placed away from the electric connecting portion D, the drain electrode portion between the constricted portion a (or b) and the electric connecting portion D becomes more likely to be short-circuited (represented by a symbol X) to the data signal line 201, the scanning signal line 202, and the like. A short-circuit caused in the positions represented by the symbol X cannot be corrected even by cutting the constricted portion a (or b). However, even in the structure shown in FIG. 7, display roughness can be prevented from occurring and some defect can be corrected depending upon the kind thereof; so that this structure is also within the scope of the present invention.

It is preferable that each of the constricted portions a and b is placed at a minimum distance (about 6 $\mu$m) from the electric connecting portion D. This is because a positional shift of a contact hole caused during formation thereof is about 3 $\mu$m, and a diameter of the area of the interlayer insulator between the drain electrode and the pixel electrode which is irradiated with a laser beam is about 3 $\mu$m.

By setting the minimum distance as described above, the possibility of repair is enhanced even in the case where a current leaks between the drain electrode 222 and the data signal line 201 and between the drain electrode 222 and the scanning signal line 202. Furthermore, by placing the constricted portions a and b away from the data signal line 201 or the scanning signal line 202, the effect of cutting the constricted portion a or b on these signal lines can be decreased.

Furthermore, in the case where the drain electrode 222 is formed in a larger area as in the present invention, the gap between the data signal line 201 and the drain electrode 222 becomes small, and the possibility of leakage of the data signal line 201 and the drain electrode 222 is increased. However, by setting the gap to be a minimum distance, e.g., 4 $\mu$m, repair can be made.

Embodiment 2

In the present embodiment, the case where a reflective liquid crystal display device is operated in a normally white display mode will be described.

Figure 8:
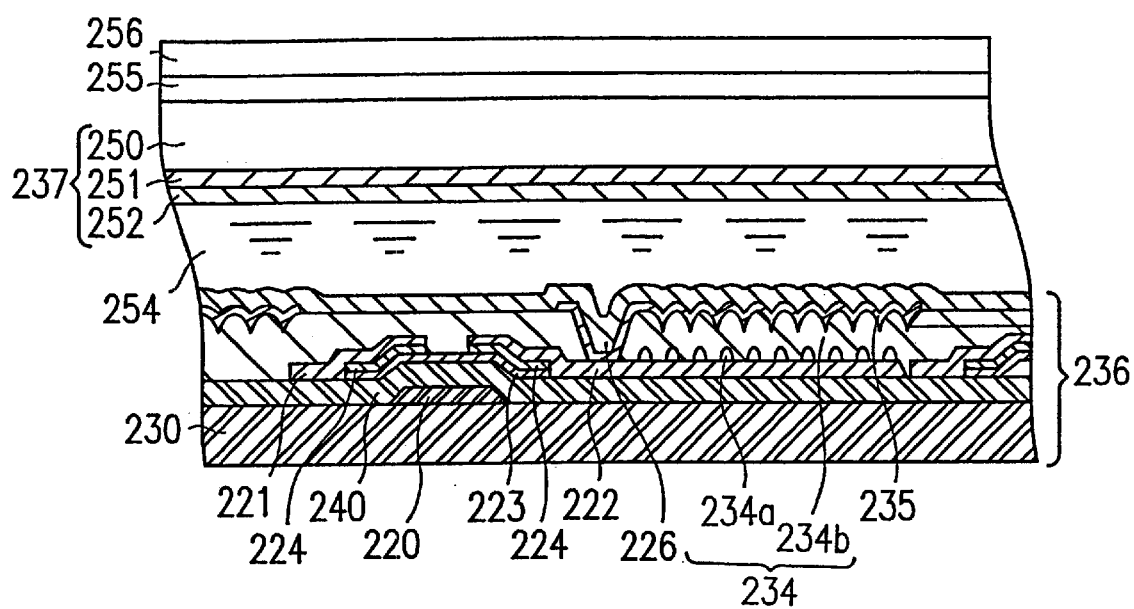
FIG. 8 is a cross-sectional view showing a reflective liquid crystal display device in Embodiment 2 of the present invention.

FIG. 8 is a cross-sectional view of a reflective liquid crystal display device in the present embodiment. The structure of the reflective liquid crystal display device in the present embodiment is identical with that in Embodiment 1, except that a display is performed in a normally white mode. Furthermore, the production steps of the reflective liquid crystal display device are the same as those in Embodiment 1, except for the step of prescribing the display mode to be a normally white mode. Thus, in the present embodiment, a drain electrode is also formed as an underlying film so as to correspond to a reflective pixel electrode. Because of this, uniformity of heat conduction and light transmittance between the substrate and the region of an interlayer insulator where at least a reflective pixel electrode is provided, and uniformity of contact properties of an interlayer insulator on the substrate, and the like are improved compared with a conventional case.

The reflective liquid crystal display device is produced as follows.

A counter substrate 237 and a active matrix substrate 236 which are produced in the same way as in Embodiment 1 are attached to each other with a sealant under the condition that spherical spacers with a diameter of about 5.5 µm are placed between the substrates (in a cell). Thereafter, the cell is deaerated, and a liquid crystal material is injected into the cell, whereby a liquid crystal layer 254 is provided. As the liquid crystal material, for example, ZLI 4792 produced by Merck & Co., Inc. is used. The liquid crystal layer 254 has an anisotropy of refractive index Δnl of about 0.094, and a retardation Δnl·d (d: cell thickness) of about 517 nm. Thereafter, an optical phase difference plate 255 and a polarizing plate 256 are attached onto the counter substrate 237. The reflective liquid crystal display device thus obtained in the present embodiment is operated in a normally white mode.

In the reflective liquid crystal display device, the same effect as that in Embodiment 1 is obtained. However, a method for correcting a defect is required to be changed due to the difference in a display mode. Hereinafter, the content of defect repair will be specifically described referring to Table 1.

In the case where a defect found during the inspection step is caused by a short-circuit between the gate electrode and the drain electrode at the point A of the TFT portion shown in FIG. 3, a correcting method disclosed by the conventional example in Japanese Publication for Opposition No. 3-55985 is used, i.e., the gate electrode is cut from the scanning signal line in the TFT portion, and the source electrode and the drain electrode are short-circuited. Accordingly, an averaged voltage of data signals is always applied to pixel electrodes, and a defective pixel portion becomes unnoticeable.

In the case where the drain electrode and the drain electrode adjacent thereto are short-circuited at the point B, a defective point is cut without conducting the correcting method disclosed in Japanese Publication for Opposition No. 3-55985. Furthermore, in the case where the drain electrode and the scanning signal line are short-circuited at the point C, the constricted portion b is cut without conducting the correcting method disclosed in Japanese Publication for Opposition No. 3-55985. Thus, the reflective pixel electrode can be cut from the scanning signal line, and an averaged voltage of data signals can be applied to pixel electrodes.

Furthermore, in the case where the point A in the TFT portion and the point C on the downstream side are short-circuited, the constricted portion b is cut, and the correcting method disclosed in Japanese Publication for Opposition No. 3-55985 is conducted. In the case where the point B on the upstream side and the point C on the downstream side are short-circuited, a defective point and the constricted portion b are cut without conducting the correcting method disclosed in Japanese Publication for Opposition No. 3-55985.

By correcting defects as descried above, defects adversely affecting the display characteristics such as line defects and bright points are not displayed, and mass-production efficiency of the reflective liquid crystal display device can be improved.

Embodiment 3

In the present embodiment, the case where a generation of vertical stripes is suppressed will be described.

The vertical stripes are based on the following: when a display screen including a plurality of reflective pixel electrodes 235 in a delta arrangement (which are repeatedly formed, with a pixel containing pixel regions having two kinds of shapes as shown in FIG. 4 being as one unit) is observed under the condition of being divided with vertical lines at a predetermined pitch, the difference in a percentage of each color is detected in each divided region in a color display. The reason for this will be described, exemplifying one (upper side in FIG. 4) of the two kinds of reflective pixel electrodes 235 shown in FIG. 4. A portion of the reflective pixel electrode 235 overlaps the scanning signal line 202. A further portion of this overlapping portion is extended away from the reflective pixel electrode 235 in a direction parallel to the scanning signal line 202. This is described in detail in Japanese Patent Application No. 9-285766.

Figure 9:
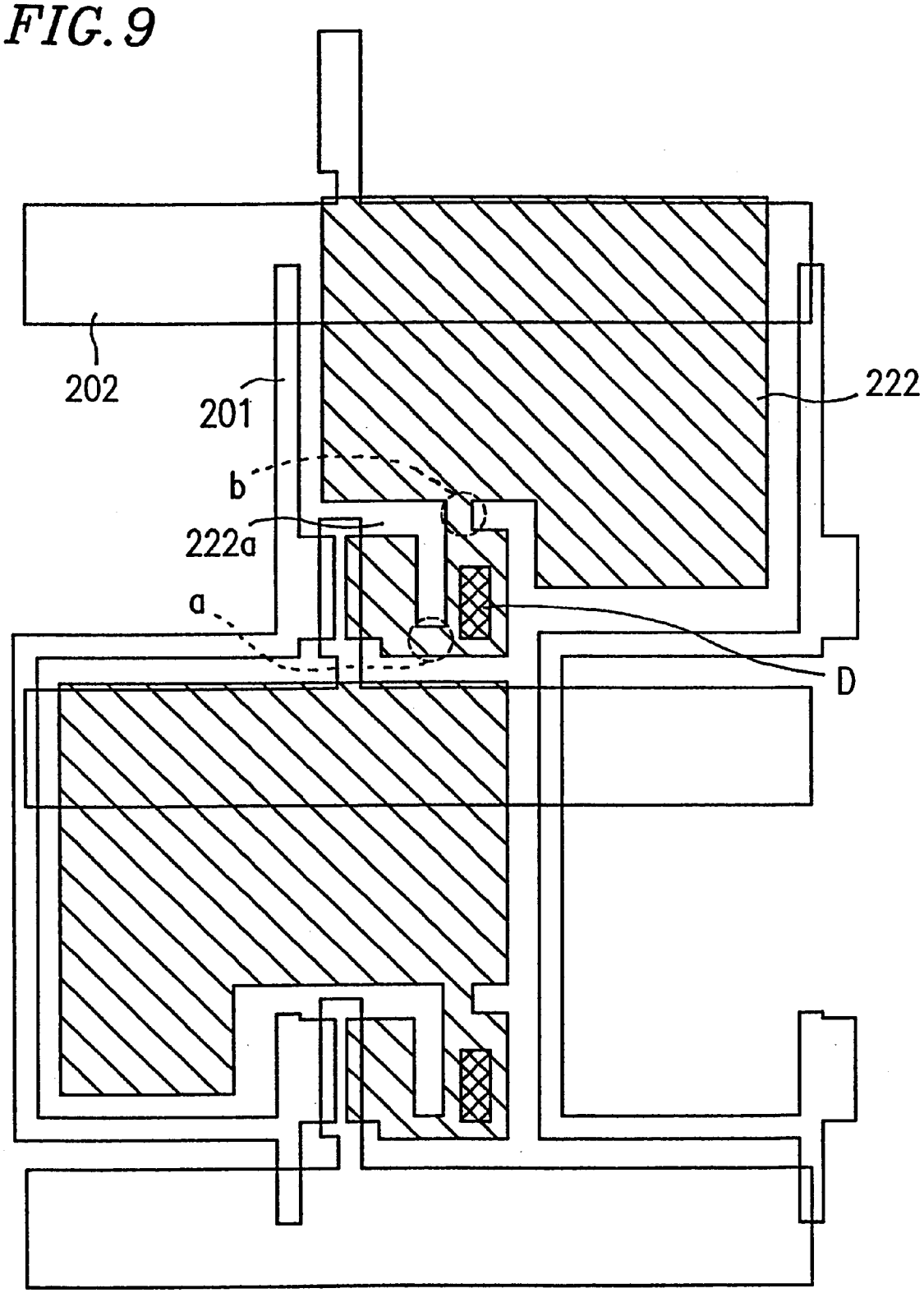
FIG. 9 is a plan view showing TFTs, drain electrodes, data signal lines, and scanning signal lines provided in a reflective liquid crystal display device in Embodiment 3 of the present invention.
Figure 10:
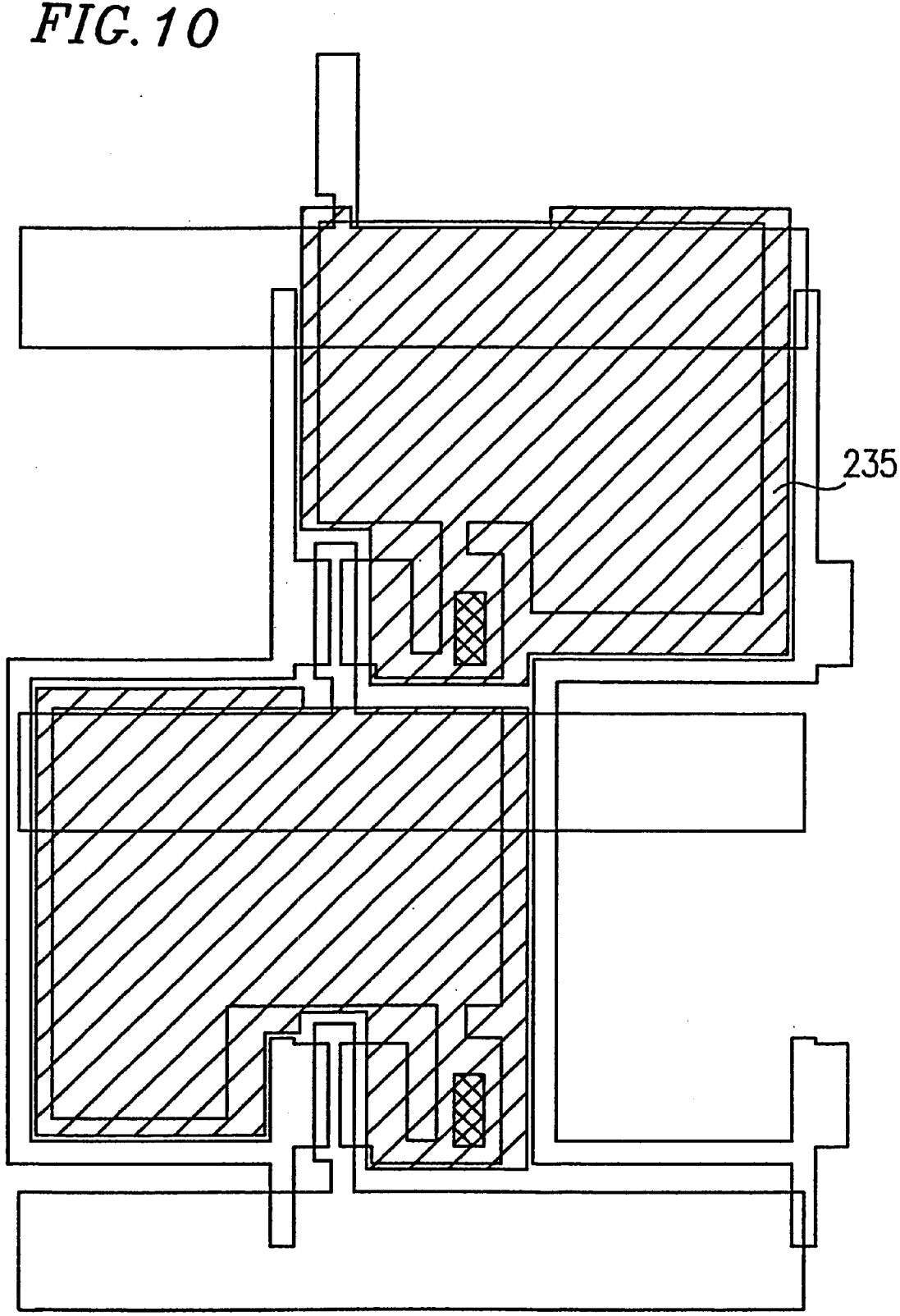
FIG. 10 is a plan view of the reflective liquid crystal display device shown in FIG. 9 further including reflective pixel electrodes.

In order to solve the above-mentioned problem, the positions of the TFTs are changed as shown in FIG. 9 in such a manner that the shape of the reflective pixel electrode 235 is substantially a square as shown in FIG. 10. FIG. 9 is a plan view showing the shape of the drain electrodes 222.

In this case, the drain electrode 222 is formed so as to correspond to the size of a pixel. Therefore, the difference in partial thermal conductivity is prevented or suppressed, and display roughness can be prevented. Furthermore, by adopting a square pixel structure, vertical stripes become unlikely to be formed. Furthermore, in this case, a defect can also be corrected in accordance with Table 1 depending upon a display mode.

Embodiment 4

In the above-mentioned embodiments, a Cs On Gate structure is described, in which a storage capacitance portion is formed of a portion of the reflection electrode which overlaps the scanning signal line, whereas in Embodiment 4, a common line is formed separately from a scanning signal line, and storage capacitance is formed on the common line.

Figure 11:
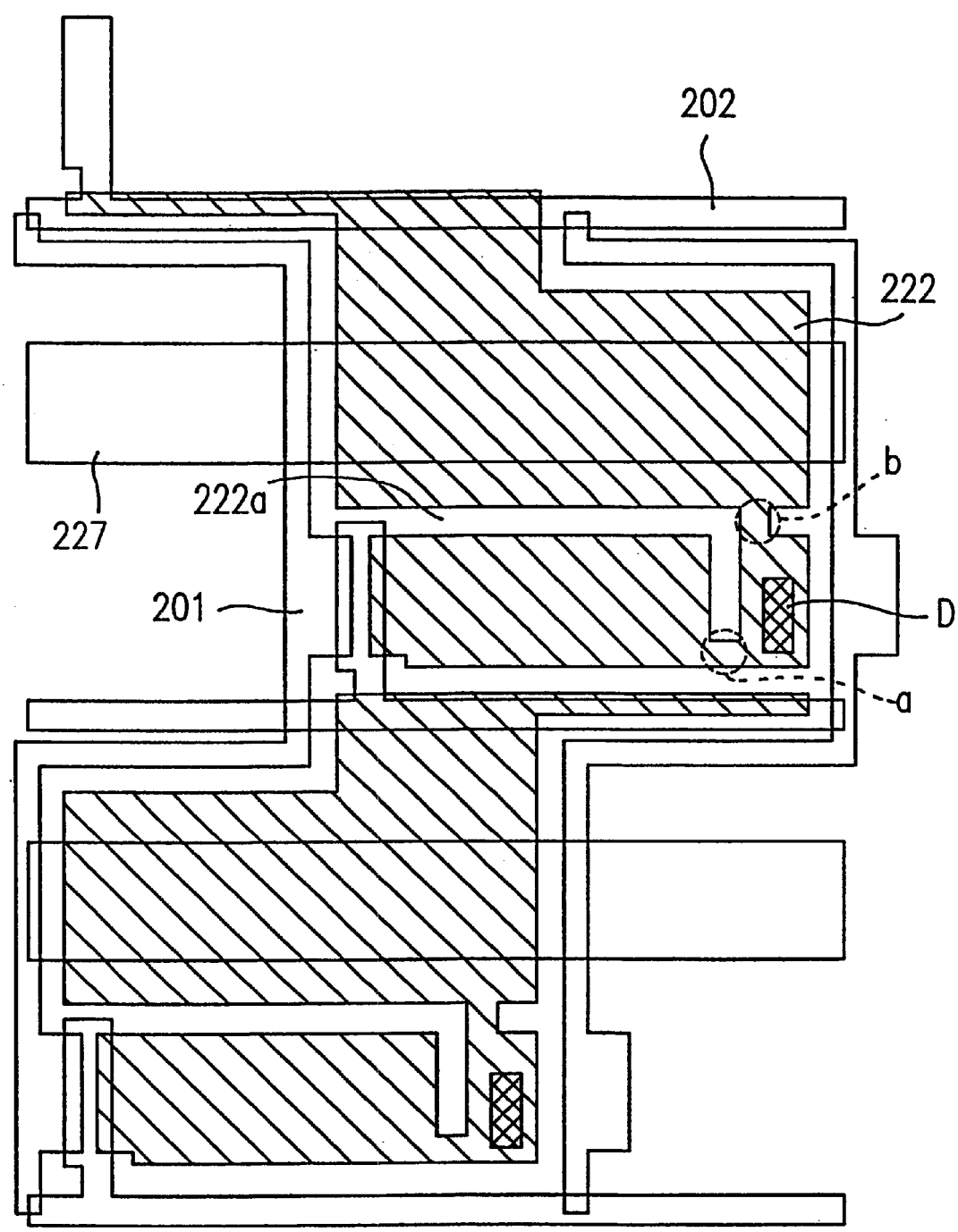
FIG. 11 is a plan view showing TFTs, drain electrodes, data signal lines, and scanning signal lines provided in a reflective liquid crystal display device in Embodiment 4 of the present invention.
Figure 12:
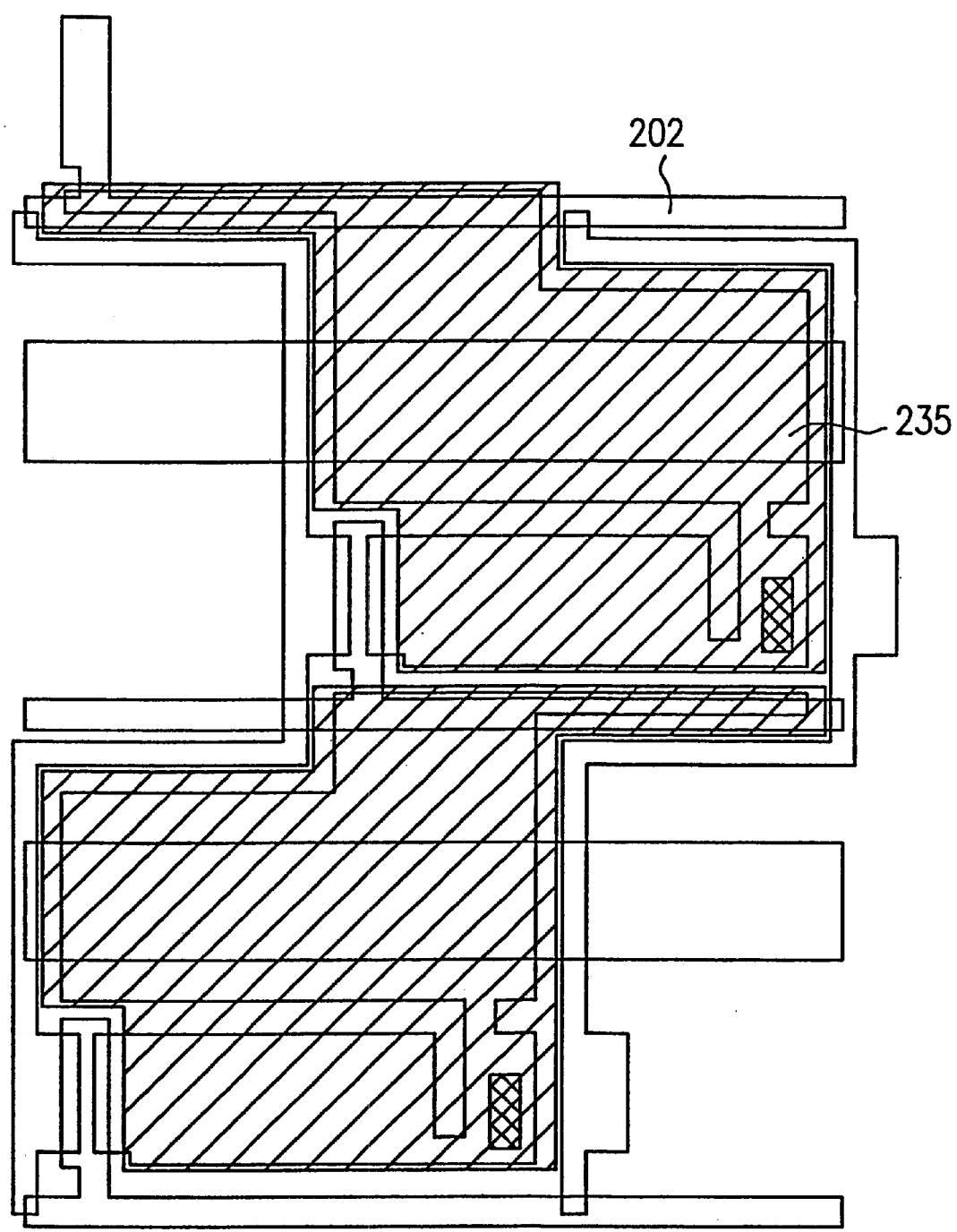
FIG. 12 is a plan view of the reflective liquid crystal display device shown in FIG. 11 further including reflective pixel electrodes.
Figure 13:
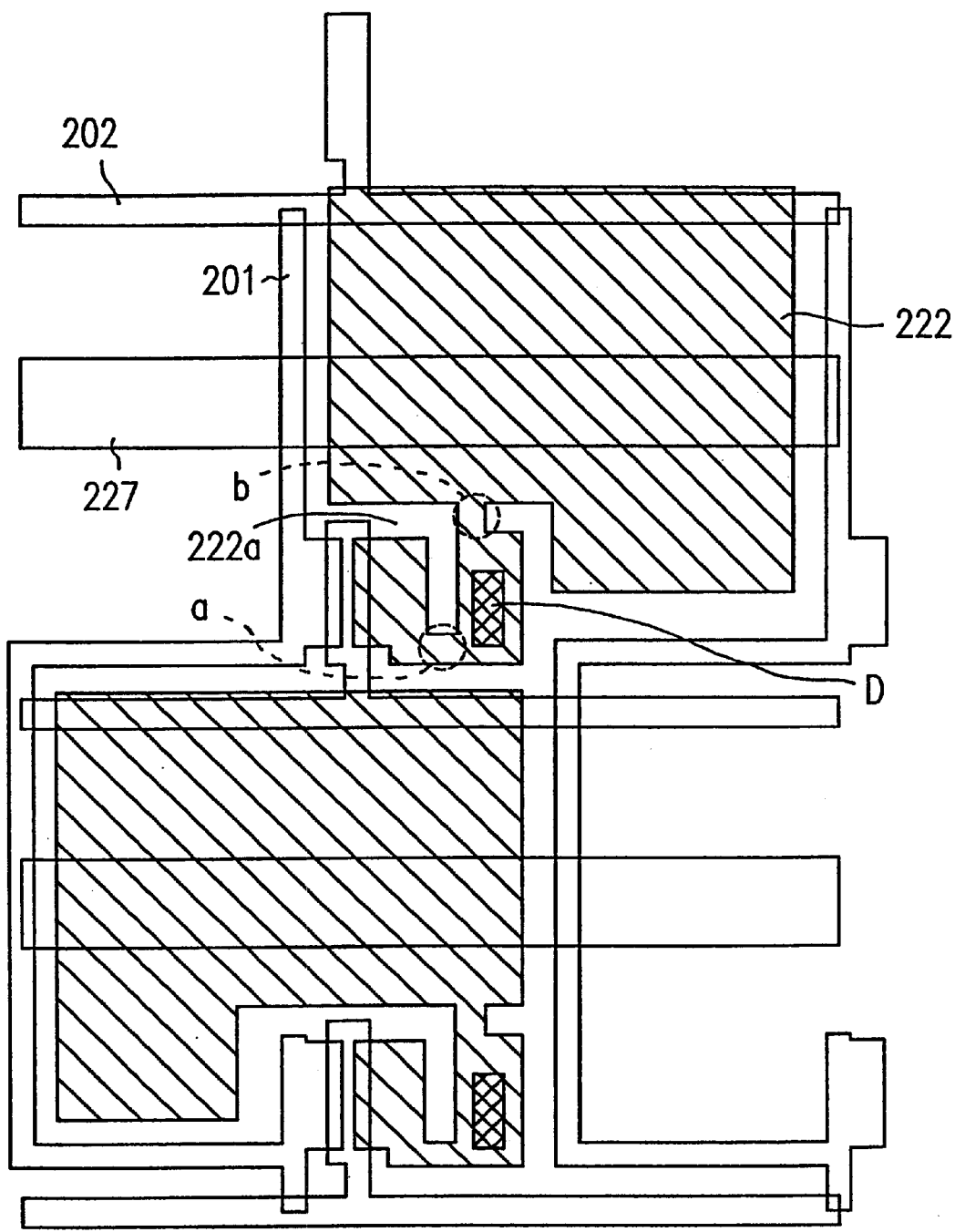
FIG. 13 is a plan view showing TFTs, drain electrodes, data signal lines, and scanning signal lines provided in another reflective liquid crystal display device in Embodiment 4 of the present invention.
Figure 14:
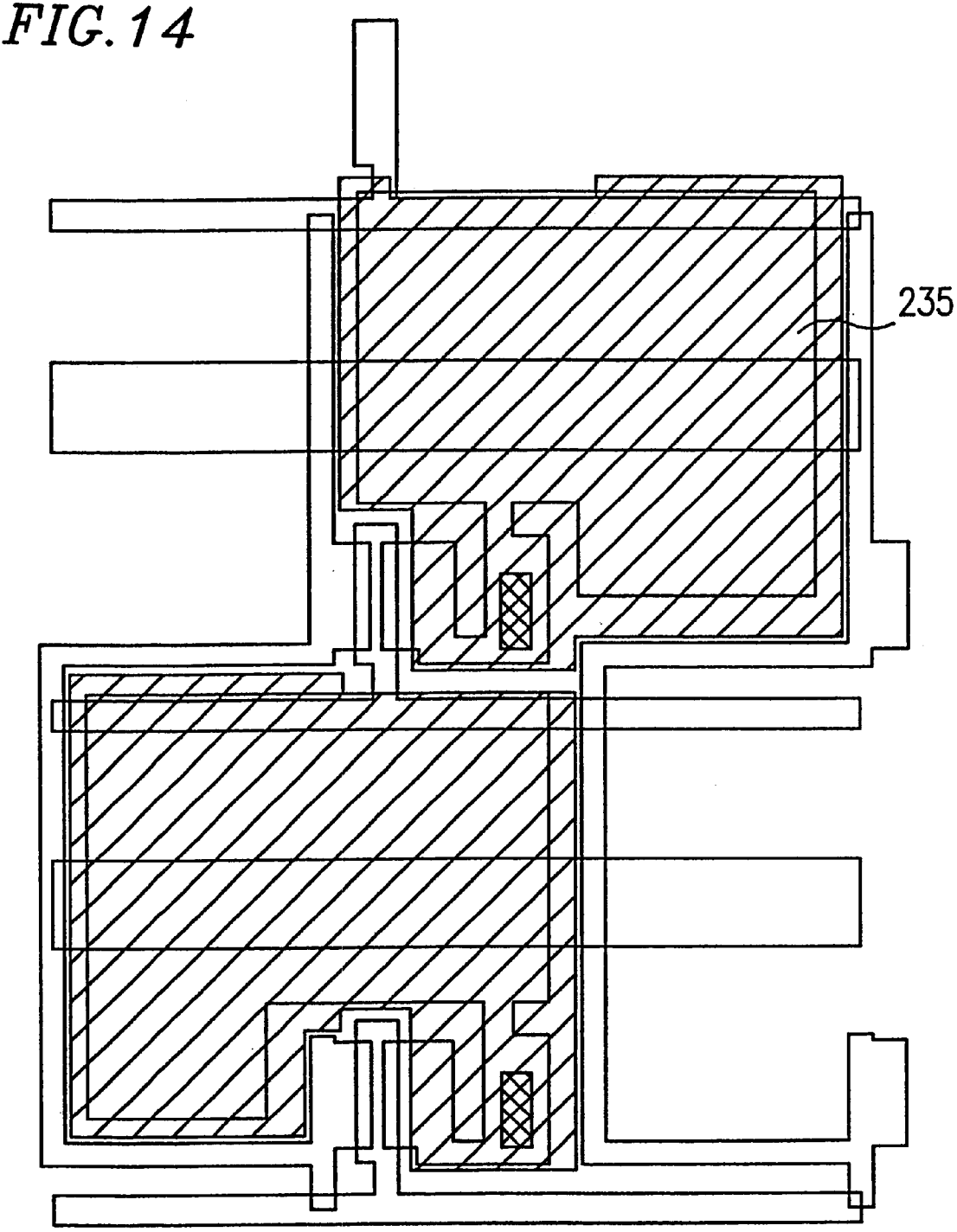
FIG. 14 is a plan view of the reflective liquid crystal display device shown in FIG. 13 further including reflective pixel electrodes.

FIGS. 11 and 12 respectively show drain electrodes and reflective pixel electrodes corresponding to those in Embodiment 1. FIGS. 13 and 14 respectively show drain electrodes and reflective pixel electrodes corresponding to those in Embodiment 3.

In the cases shown in FIGS. 11 through 14, a common line (storage capacitance line) 227 for storage capacitance is formed so as to be opposed to the drain electrode 222, separately from the scanning signal line 202. Thus, even when the width of the scanning signal line 202 is made smaller, relatively large storage capacitance can be secured; as a result, an area of an overlapping portion between the reflective pixel electrode 235 and the scanning signal line 202 becomes small, and the shape of a pixel electrode can be made into more of a square than in Embodiment 1. Thus, the effect of preventing vertical stripes is also obtained.

In Embodiment 4, the drain electrode 222 as the underlying film is also formed in a shape more like that of the reflective pixel electrode 235 so that physical characteristics such as heat conduction between the substrate and the region of the interlayer insulator where the reflective pixel electrode 235 is formed can be uniformized.

Embodiment 5

In Embodiment 5, pixel electrodes are disposed in a stripe shape.

FIGS. 15 through 18 are plan views each showing a drain electrode and a reflective pixel electrode in the reflective liquid crystal display device in the present embodiment.

Figure 15:
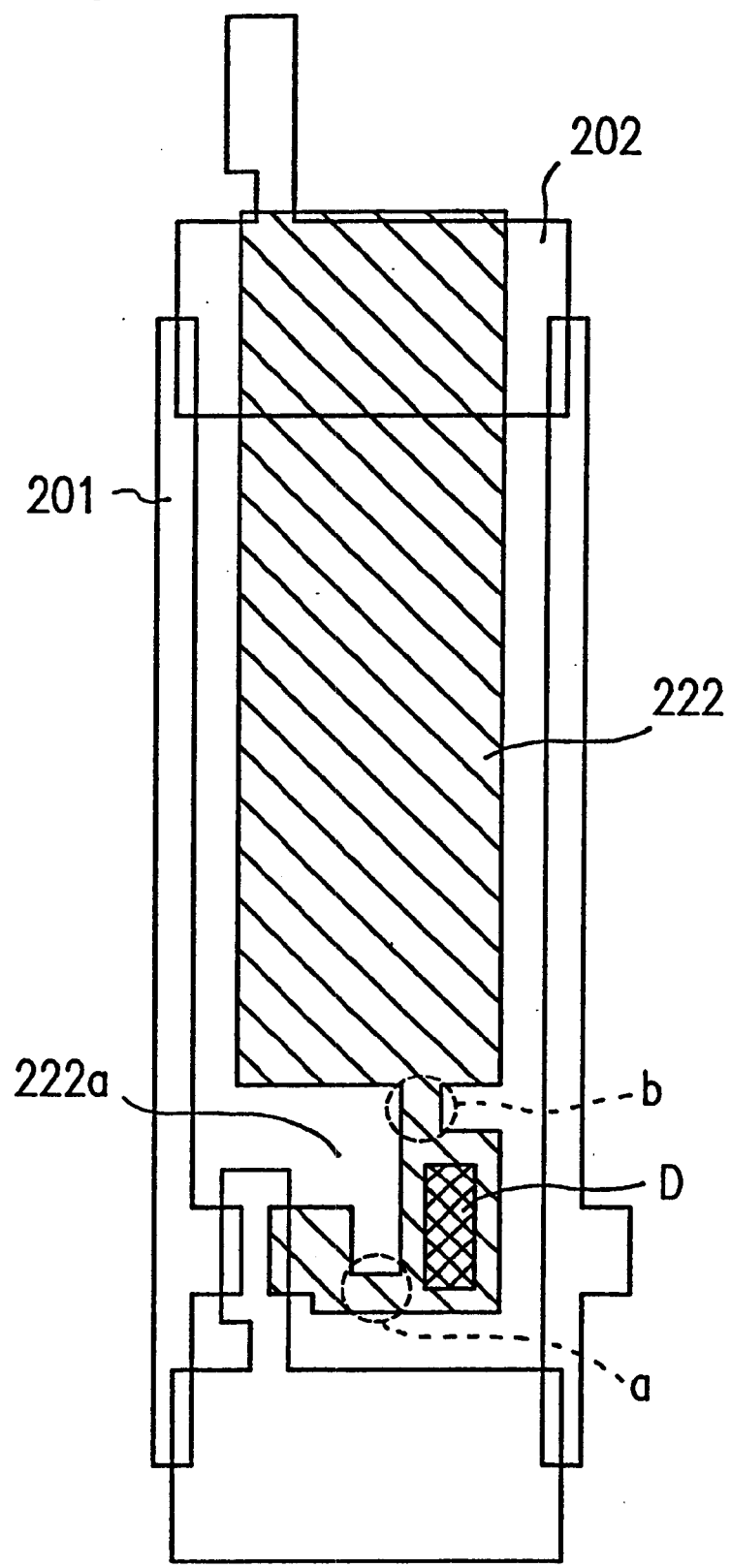
FIG. 15 is a plan view showing a TFT, a drain electrode, a data signal line, and a scanning signal line provided in an reflective liquid crystal display device in Embodiment 5 of the present invention.
Figure 16:
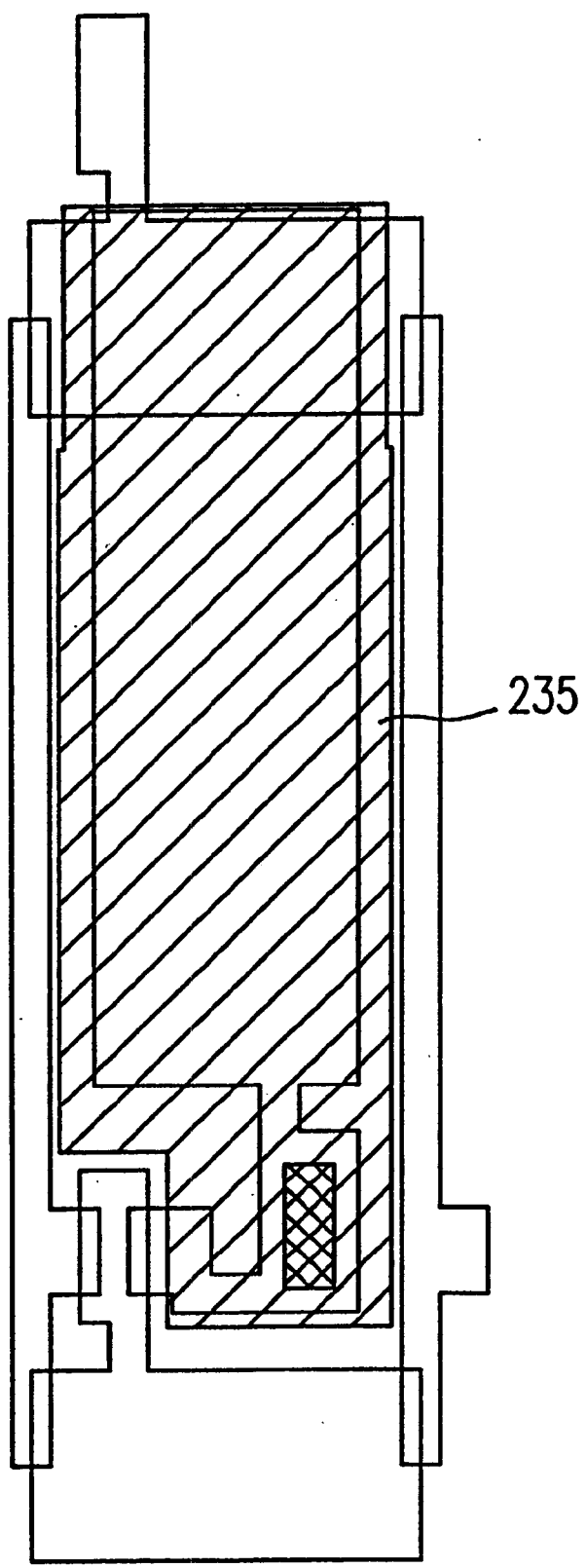
FIG. 16 is a plan view of the reflective liquid crystal display device shown in FIG. 15 further including a reflective pixel electrode.
Figure 17:
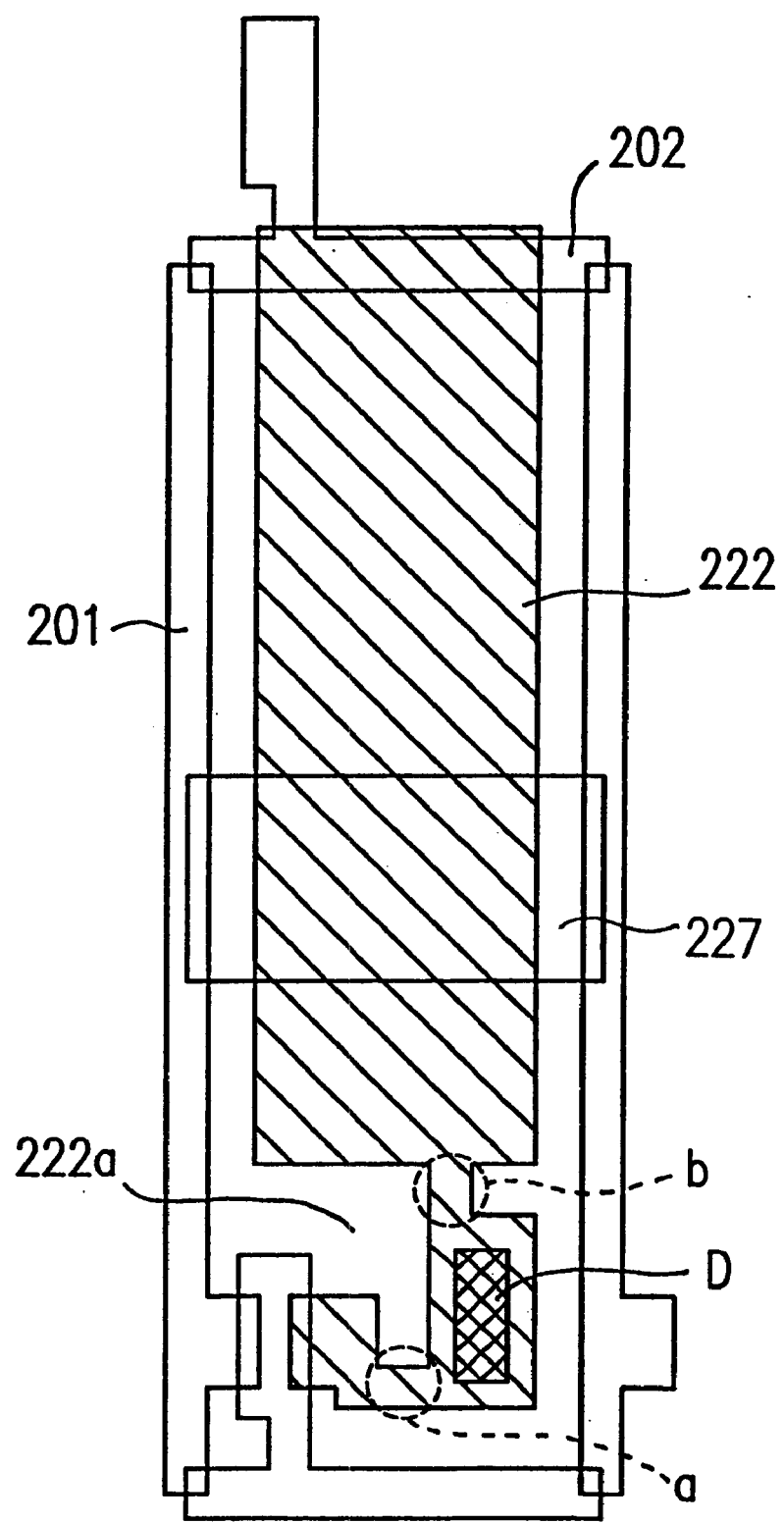
FIG. 17 is a plan view showing a TFT, a drain electrode, a data signal line, and a scanning signal line provided in another reflective liquid crystal display device in Embodiment 5 of the present invention.
Figure 18:
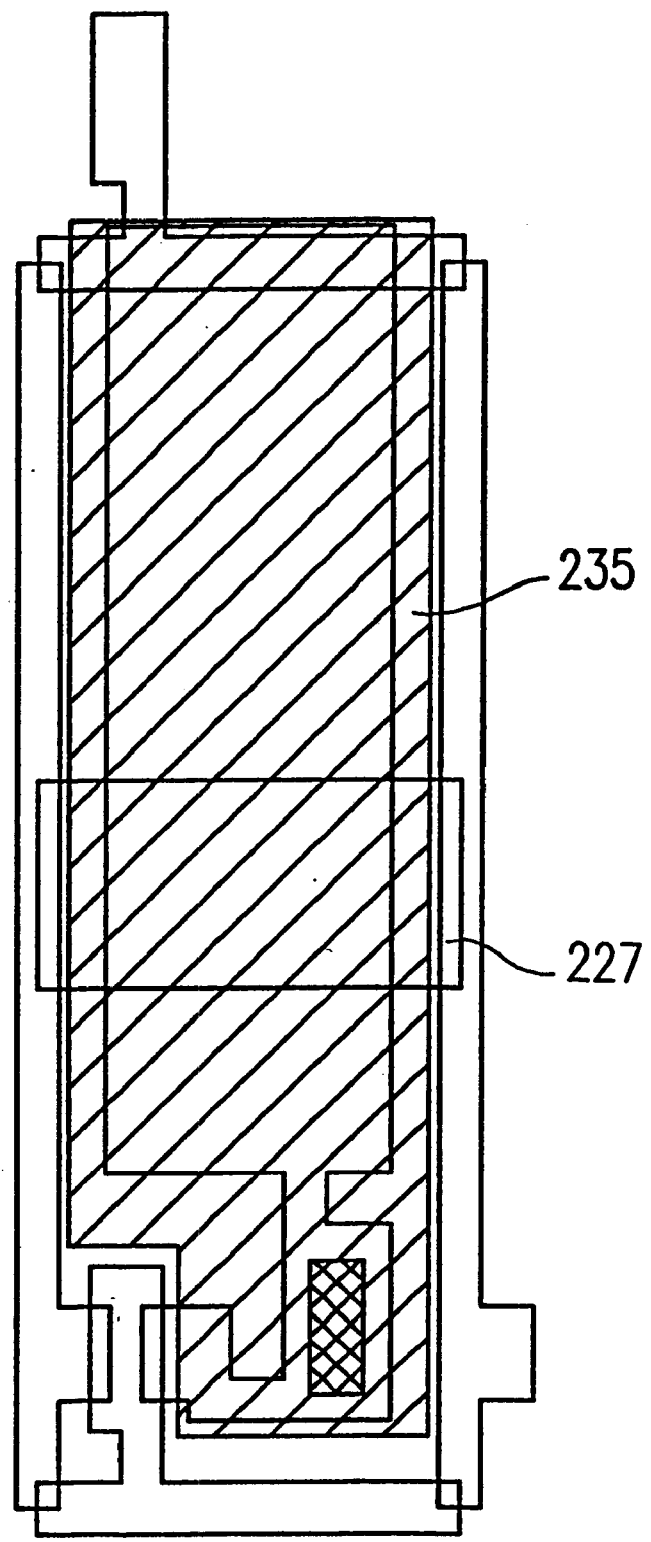
FIG. 18 is a plan view of the reflective liquid crystal display device shown in FIG. 17 further including a reflective pixel electrode.

FIGS. 15 and 16 show the case where a storage capacitance portion has a Cs On Gate structure. FIGS. 17 and 18 show the case where the common line 227 is separately formed. Even in the structure in which reflective pixel electrodes are disposed in a stripe shape, display roughness can be prevented and a defect can be corrected in the same way as in the above-mentioned embodiments.

Embodiment 6

In Embodiment 6, the drain electrode 222 and island-shaped thin films form an underlying film of the interlayer insulator.

Figure 19:
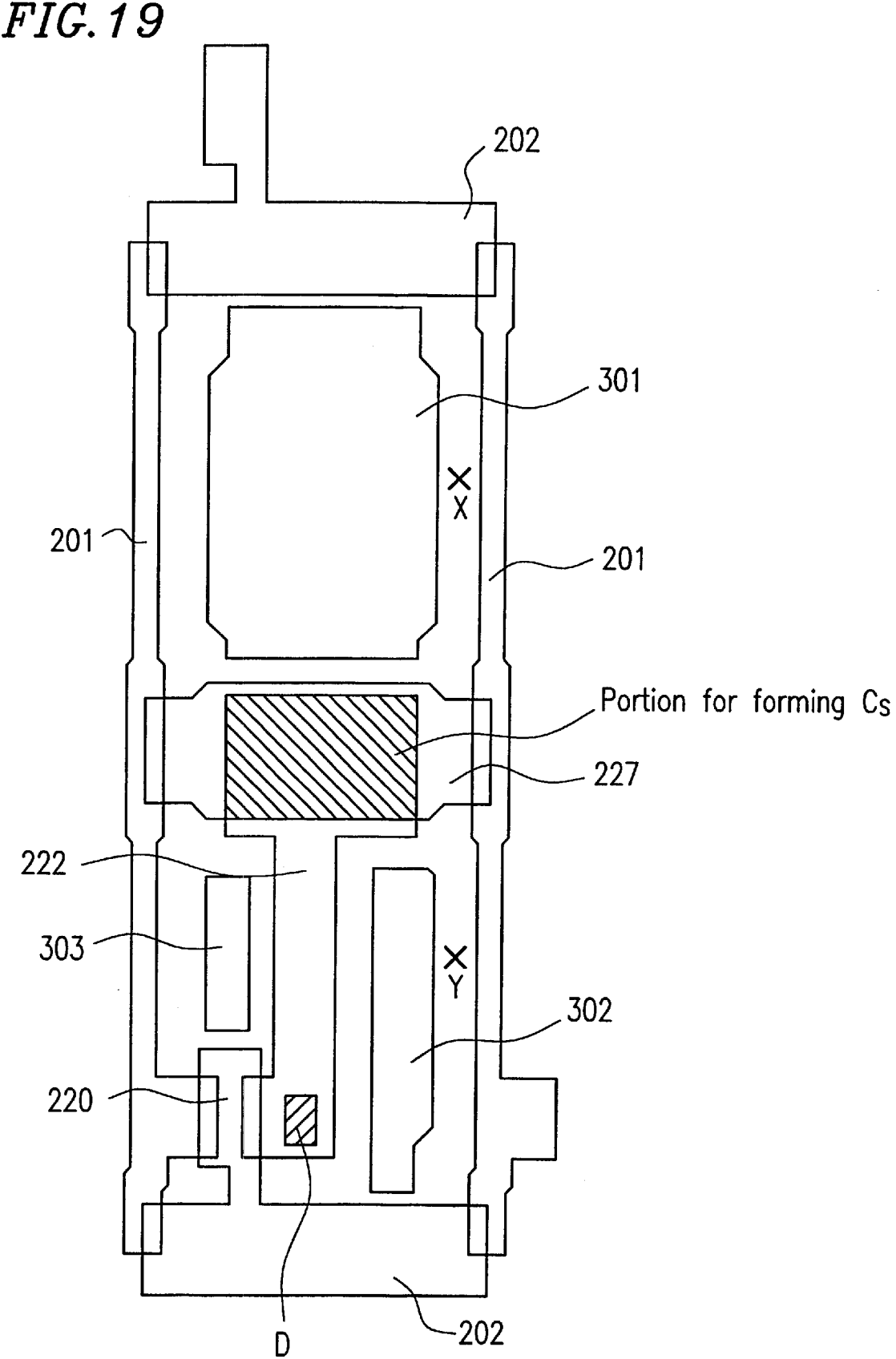
FIG. 19 is a plan view exemplifying a drain electrode and island-shaped thin films of a reflective liquid crystal display device in Embodiment 6 of the present invention.
Figure 20:
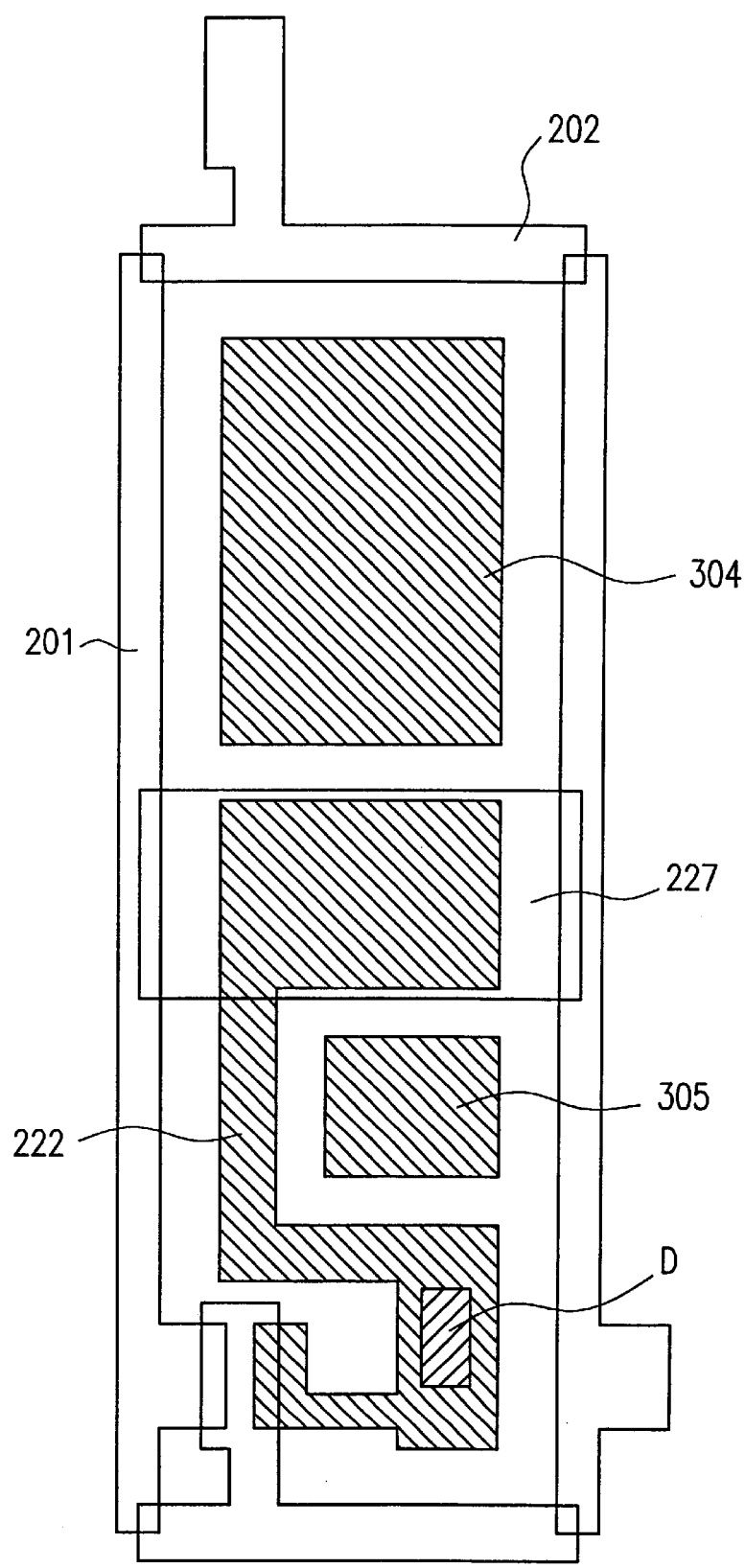
FIG. 20 is a plan view exemplifying a drain electrode and island-shaped thin films of a reflective liquid crystal display device in Embodiment 6 of the present invention.
Figure 21:
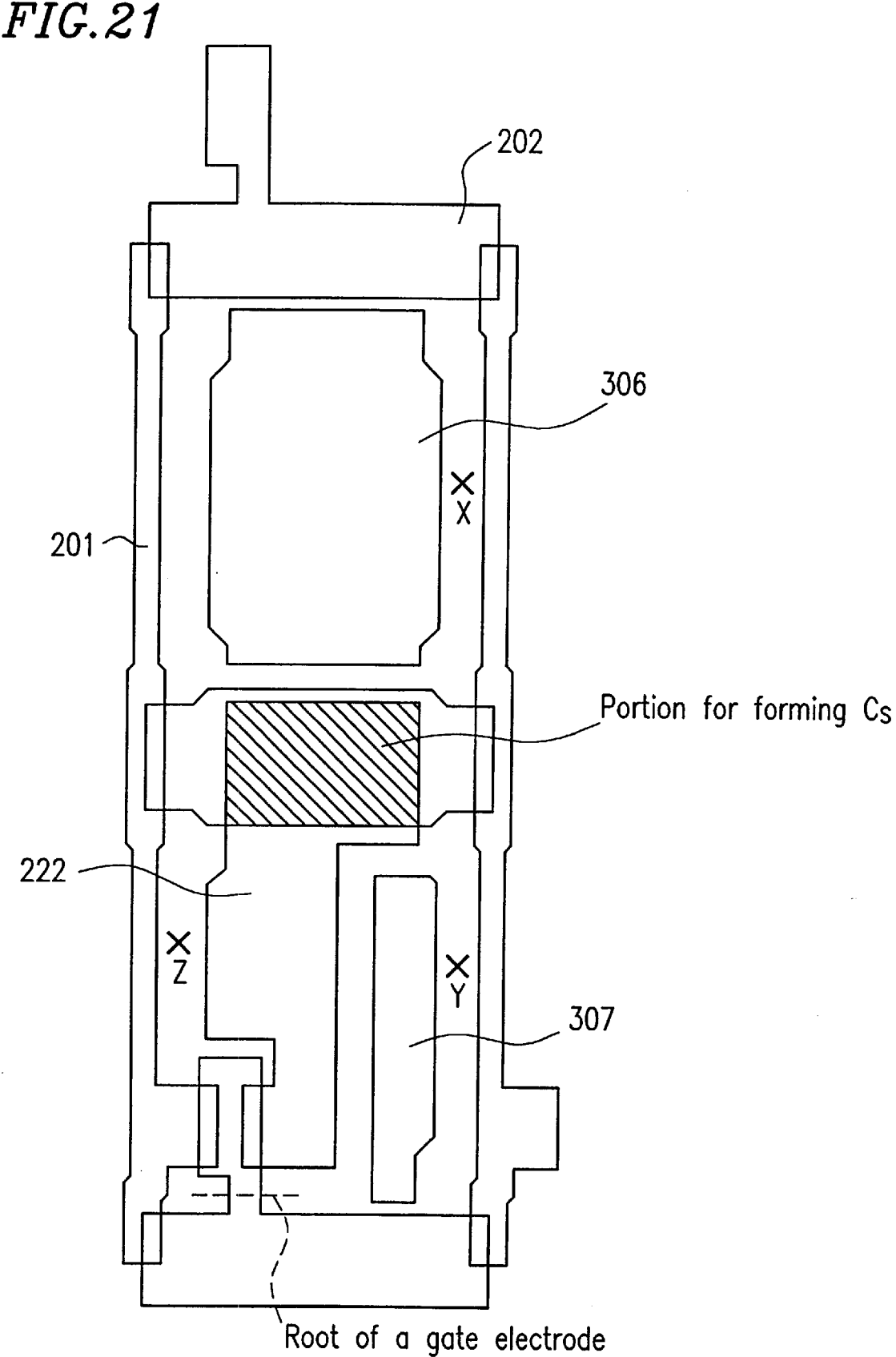
FIG. 21 is a plan view exemplifying a drain electrode and island-shaped thin films of a reflective liquid crystal display device in Embodiment 6 of the present invention.
Figure 22:
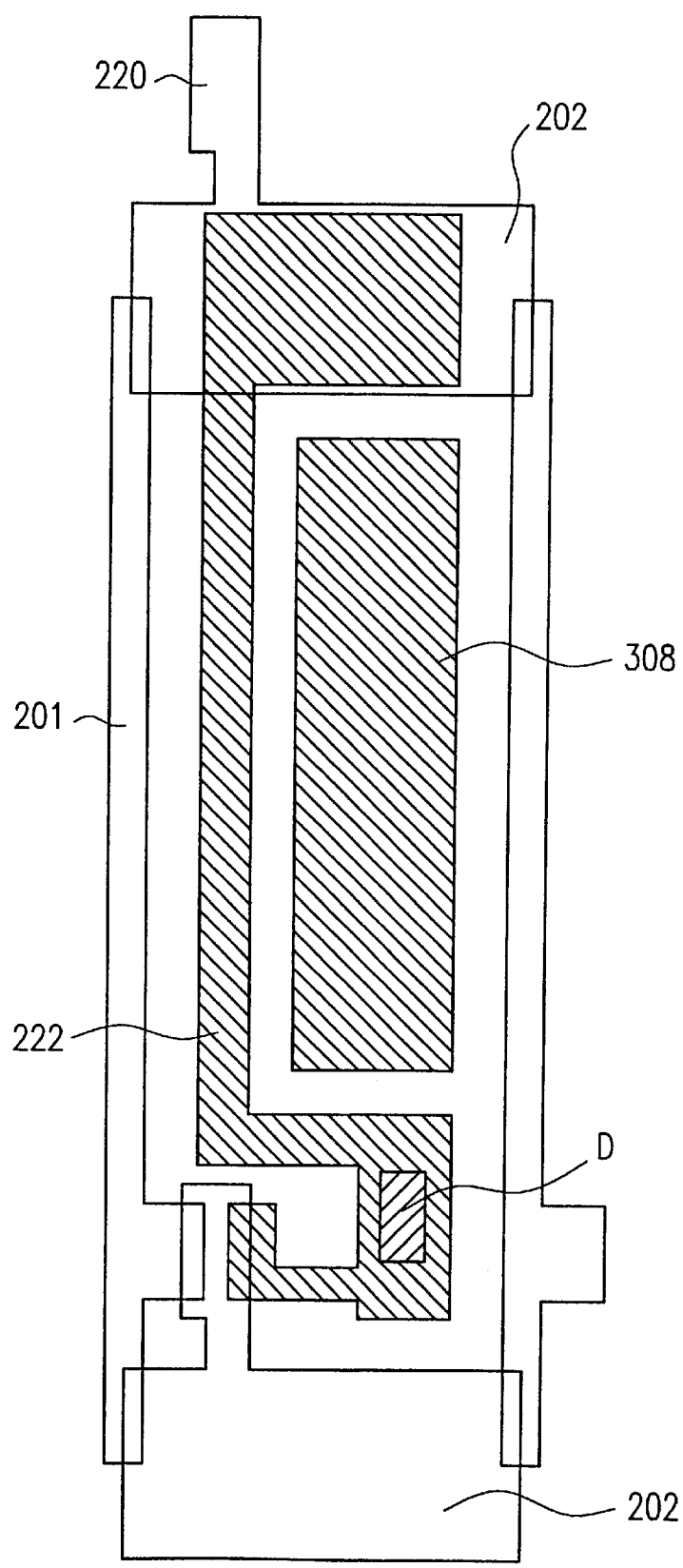
FIG. 22 is a plan view exemplifying a drain electrode and an island-shaped thin film of a reflective liquid crystal display device in Embodiment 6 of the present invention.

FIGS. 19 through 22 are plan views each showing the drain electrode 222 and the island-shaped thin films in a reflective liquid crystal display device in the present embodiment. FIGS. 19 through 21 show the case where the common line 227 is separately provided to form storage capacitance. FIG. 22 shows the case where a storage capacitance portion has a Cs On Gate structure. The reflective pixel electrode is not shown in these figures, the shape of the reflective pixel electrode may be the same as that of the reflective pixel electrode 235 as shown in FIG. 16 related to Embodiment 5.

As shown in FIG. 19, the drain electrode 222 and island-shaped thin films 301, 302, and 303 made of a material having the heat conduction characteristics, light transmission characteristics, or the like similar to those of a drain electrode material are formed as an underlying film on the gate insulating film (not shown). The drain electrode 222 and the island-shaped thin films 301, 302, and 303 are provided so as to occupy a region surrounded by the scanning signal line 202 and the data signal line 201 as much as possible. More specifically, the underlying film is formed so as to correspond to the shape of the reflective pixel electrode (not shown) to be formed over the drain electrode 222 and the island-shaped thin films 301, 302, and 303 via the interlayer insulator (not shown). The island-shaped thin films 301 through 303 are electrically insulated from the drain electrode 222. More specifically, only the drain electrode 222 is electrically connected to the reflective pixel electrode in the electric connecting portion D and forms storage capacitance together with the common line 227.

The island-shaped thin films 301 through 303 may be formed, for example, by patterning a Ta thin film together with the drain electrode 222 and the data signal line 201 during formation of the drain electrode 222. This eliminates an excess step, and the island-shaped thin films 301 through 303 can be formed by using the same material (i.e., the material having the same physical property) as that of the drain electrode 222. The drain electrode 222 and the island-shaped thin films 301 through 303 function as the underlying film for the interlayer insulator to be formed thereon.

In the case where a short-circuit is caused at points X or Y between the island-shaped thin film 301 and the data signal line 201 or between the island-shaped thin film 302 and the data signal line 201, since the island-shaped thin films 301 and 302 are insulated from the drain electrode 222, the reflective pixel electrode will not be affected even without the above-mentioned defect repair.

Furthermore, the shapes of the island-shaped thin films 301 through 303 and the drain electrode 222 are not specified, and may be changed to a desired shape so that patterning and contact properties become satisfactory. For example, in the case of the island-shaped thin film 302 in a rectangular shape shown in FIG. 19, the thin film may easily peel off due to poor contact properties. In order to prevent this problem, as shown in FIG. 20, the shape of the drain electrode 222 is changed so that the island-shaped thin films 304 and 305 are formed in a shape closer to a square.

Alternatively, in the case where the island-shaped thin film is positioned between the drain electrode 222 and the data signal line 201 supplying a data signal to the drain electrode 222 (e.g., in the case of the island-shaped thin film 303 in FIG. 19), the island-shaped thin film may be integrally formed with the adjacent drain electrode 222 as shown in FIG. 21. The other island-shaped thin films 306 and 307 respectively have substantially the same shapes as those of the island-shaped thin films 301 and 302 shown in FIG. 19. In this case, even when a short-circuit is caused at a point Z, if the root of the gate electrode 222 is cut as shown in FIG. 21, a display defect can be corrected by the correcting method disclosed in Japanese Publication for Opposition No. 3-55985.

As shown in FIG. 22, even in the Cs on Gate structure in which the drain electrode 222 overlaps the scanning signal line 202 to form storage capacitance, an underlying film can be formed by providing an island-shaped thin film 308.

As described above, in order to uniformize the effect on the interlayer insulator, the ratio (occupying percentage) of the area of the underlying film (drain electrode and island-shaped thin film) to the area of the reflective pixel electrode is desirably set as equal as possible. Although the preferable occupying percentage is varied depending upon the pixel size, material for the interlayer insulator, process conditions, and the like, it is preferably 40% or more, more preferably 50% or more. In order to prevent patterning defects from occurring, the occupying percentage is preferably 90% or less, more preferably less than 85%, which is determined by the pixel size and the minimum space between the data signal line, the drain electrode, and the island-shaped thin film, which are limited by process precision.

As described above, in the present embodiment, the underlying film is formed of the drain electrode and the island-shaped thin film made of a material having the same physical properties (thermal conductivity, light transmittance, contact properties with the interlayer insulator, etc.) as those of the drain electrode material. The shape and arrangement of the drain electrode and the island-shaped thin film may be arbitrarily determined. However, it is desirable that the underlying film formed of the drain electrode and the island-shaped thin film is provided so as to correspond to the shape of the reflective pixel electrode. More specifically, it is desirable that the underlying film is provided, corresponding to the shape of the reflective pixel electrode, in such a manner as to be uniformly dispersed in the entire region of the reflective pixel electrode. Even in the case where the underlying film is formed with the same occupying percentage, it is not desirable that the underlying film occupies only a part of the region of the reflective pixel electrode. Thus, the thermal conductivity and/or light transmittance between the interlayer insulator and the substrate and/or contact properties of the interlayer insulator with respect to the substrate can be uniformized in the region where the reflective pixel electrode is formed. Furthermore, by forming the underlying film as in the present embodiment, the shape of the drain electrode can be made flexible.

In the above description, the underlying film formed of the drain electrode or the drain electrode and the island-shaped thin film is provided for the purpose of preventing or suppressing partial difference in thermal conductivity in the interlayer insulator to be formed on the underlying film. However, the present invention is not limited thereto. More specifically, even in the case where the upper surface of the interlayer insulator is prescribed to be uneven or flat, and a photosensitive material or a non-photosensitive material is used for the interlayer insulator, the performance of the obtained liquid crystal display device is less influenced by nonuniformity of the intensity of UV-light and the permeation state of a developer between a portion of the interlayer insulator under which the underlying film is present and a portion of the interlayer insulator under which the underlying film is not present. Furthermore, the height at these portions can be aligned, and the film quality of the interlayer insulator at these portions can be uniformized. Therefore, it becomes unlikely that the reflective pixel electrode will be subject to variations in shape due to the effect of the underlying film. This will be described in detail below. Herein, the case where a photosensitive material is used for the interlayer insulator, and the interlayer insulator is prescribed to be flat will be described.

Figure 23A:
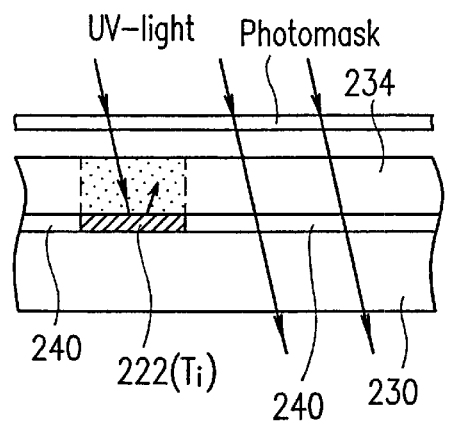
FIGS. 23A through 23F are cross-sectional views illustrating the function and effect of the present invention.

FIG. 23A is a cross-sectional view showing the vicinity of an interlayer insulator in the case where an underlying film is formed only by using a drain electrode, and the ratio of the area of the drain electrode to the area of a reflective pixel electrode is small. A drain electrode 222 having the same size as that of the conventional example is provided under an interlayer insulator 234. Since the drain electrode 222 is small, a gate insulating film 240 and the like are present in a portion which is not covered with the drain electrode 222.

In the above-mentioned structure, supposing that the interlayer insulator 234 is made of a photosensitive material (e.g., photosensitive resin), and is irradiated with light (e.g., UV-light). Because of the difference (refractive index, reflectivity, etc.) in material between the drain electrode 222 and the gate insulating film 240 (for example, the difference in material between the drain electrode 222 made of Ti and the gate insulating film 240 made of SiN), the reflection characteristics in the boundary region between the drain electrode 222 and the interlayer insulator 234 and the reflection characteristics in the boundary region between the gate insulating film 240 and the interlayer insulator 234 becomes different. Thus, in the case where UV-light is radiated to a region where the drain electrode 222 is present as an underlying film, the UV-light is reflected from the drain electrode 222, and light is transmitted through the interlayer insulator 234 twice. In the case where UV-light is radiated to a region where the gate insulating film 240 is present as an underlying film, light is transmitted through the interlayer insulator 234 only once, for example. Therefore, a cured state of the resultant interlayer insulator 234 becomes nonuniform as represented by a dotted portion shown in FIG. 23A. Thus, the film quality in the dotted portion is different from that of the other portion of the interlayer insulator 234. Furthermore, if the interlayer insulator 234 is soaked in a developer under this condition, a permeation state of the developer in the dotted portion of the interlayer insulator 234 becomes different from that of the other portion thereof, which results in collapse of the dotted portion of the interlayer insulator 234, as shown in FIG. 23B. Even further, as shown in FIG. 23C, when the reflective pixel electrode 235 is formed on the interlayer insulator 234, the surface shape of the interlayer insulator 234 is reflected onto the reflective pixel electrode 235. Since the upper surface of the dotted portion of the interlayer insulator 234 is in dented, the upper surface of the reflective pixel electrode 235 formed on the dotted portion is also in dented. Therefore, light reflected from the dented surface of the reflective pixel electrode 235 is scattered, which forms an opaque portion on the display panel, resulting in a defective display.

Figure 23D:
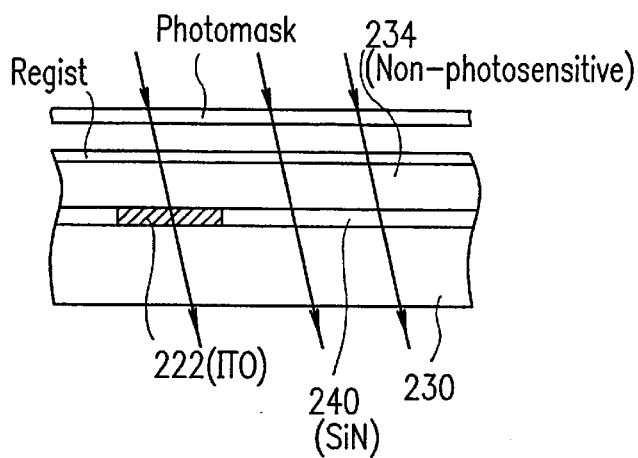
Figure 23B:
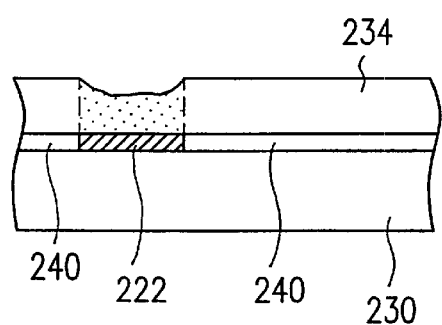
Figure 23E:
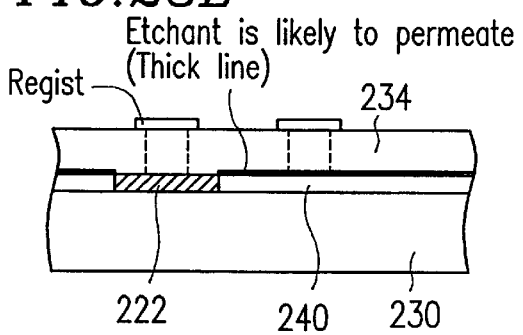
Figure 23C:
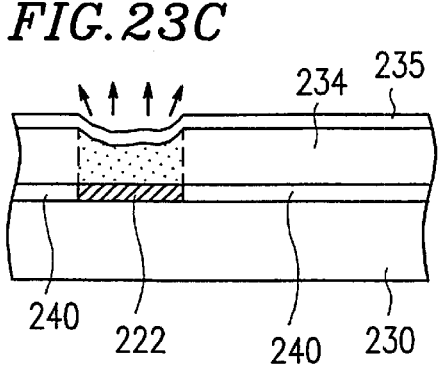
Figure 23F:
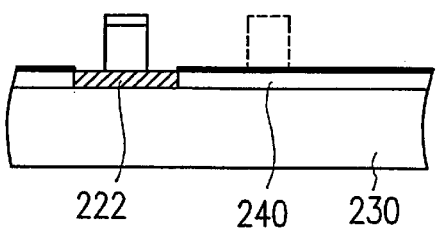
Figure 24A:
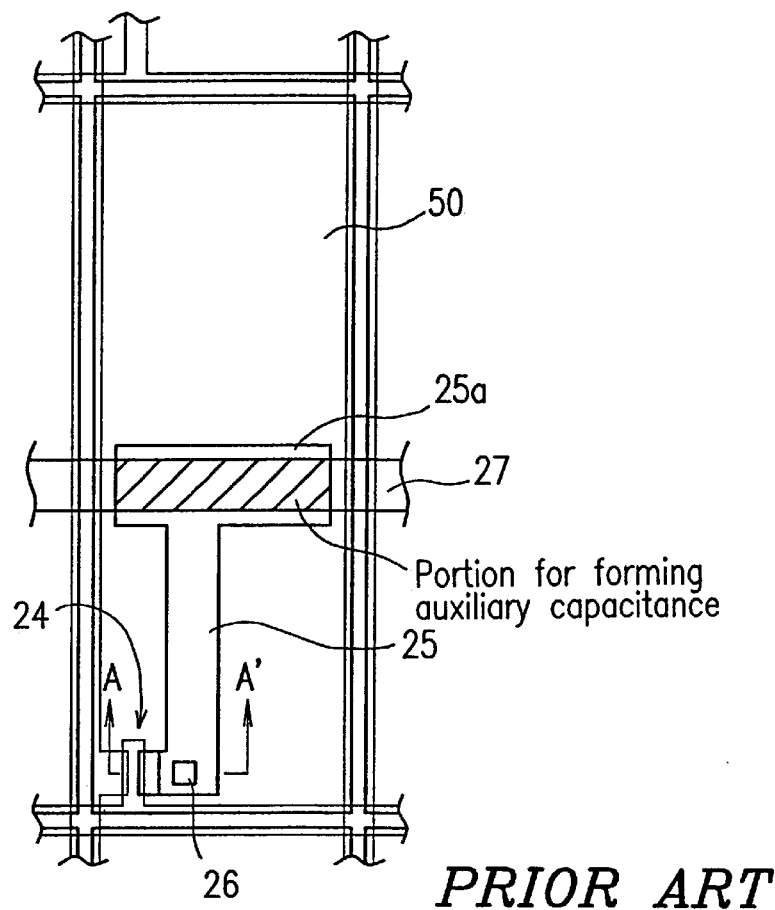
FIGS. 24A is a plan view showing a conventional liquid crystal display device, and 24B is a cross-sectional view showing a part thereof.
Figure 24B:
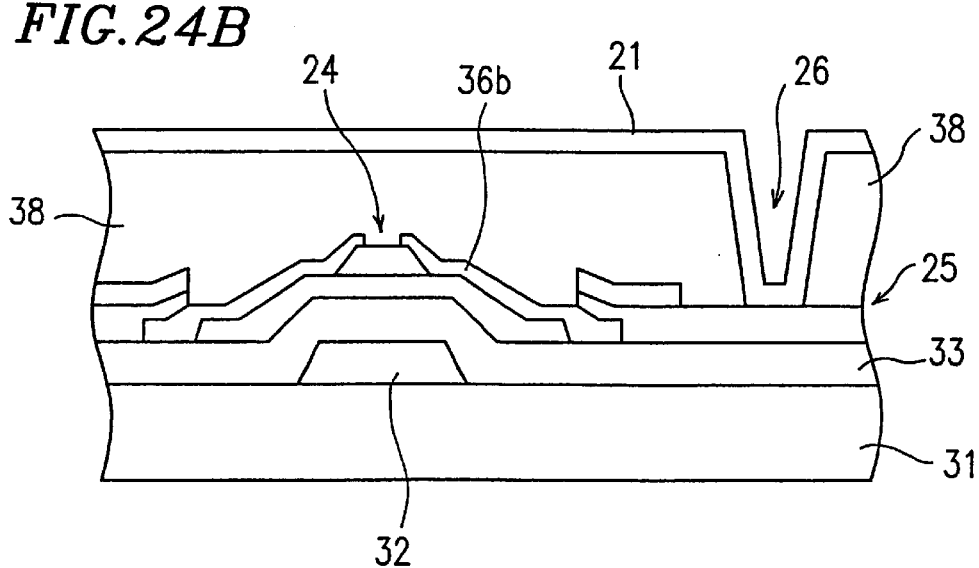
Figure 25:
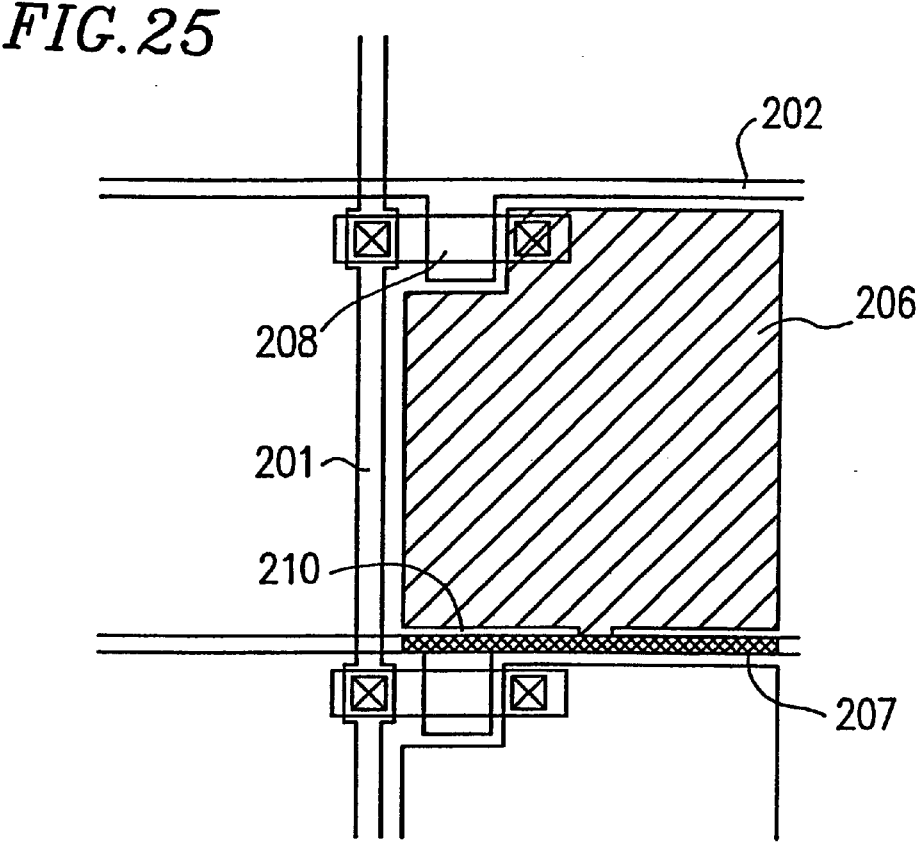
FIG. 25 is a plan view showing another conventional liquid crystal display device.
Figure 26:
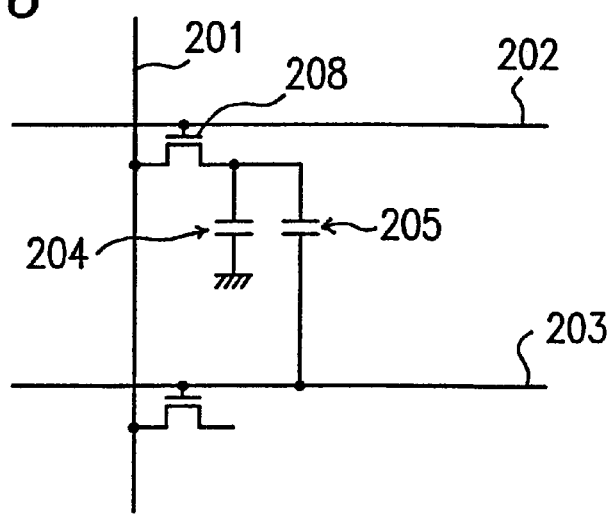
FIG. 26 is a circuit configuration diagram of the liquid crystal display device shown in FIG. 25.
Figure 27A:
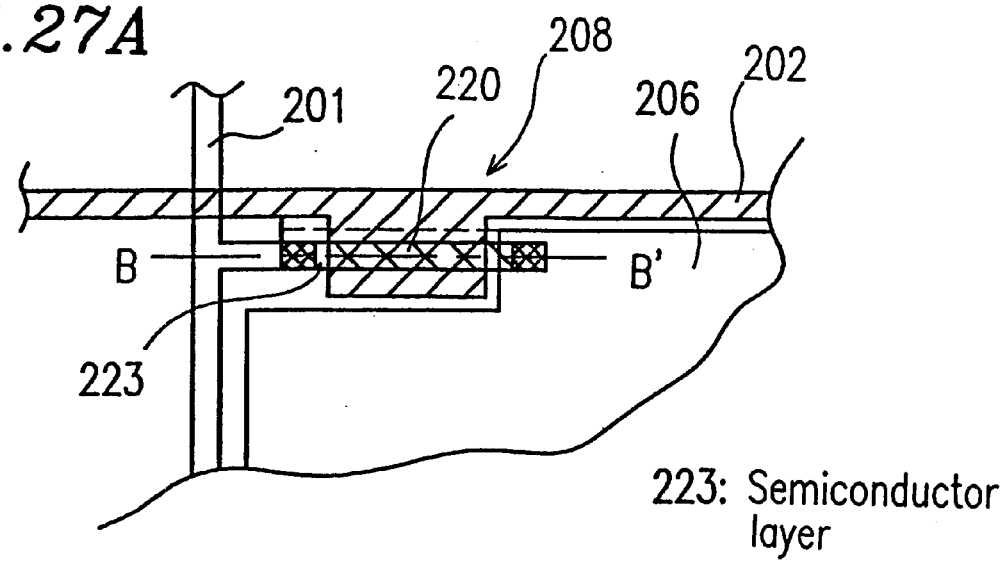
FIG. 27A is a plan view showing a still another conventional liquid crystal display device.
Figure 27B:
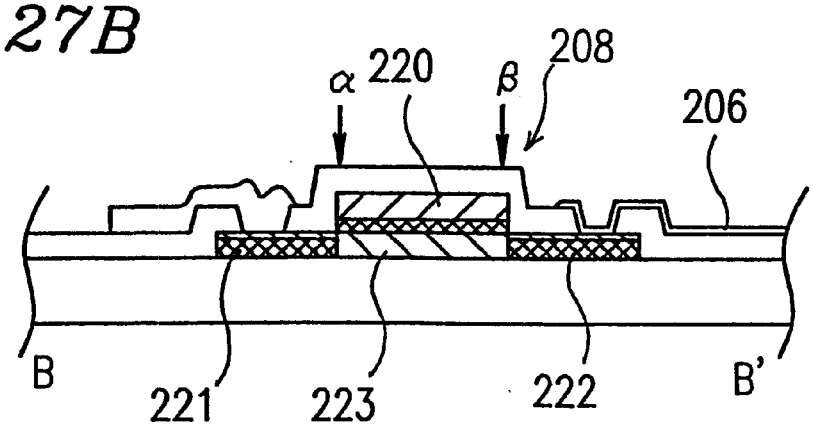
FIG. 27B is a cross-sectional view showing a transistor portion thereof.

Furthermore, in the case where the drain electrode is small unlike the present invention, as shown in FIG. 23D, even when a material for the interlayer insulator 234 is not photosensitive, the drain electrode 222 is made of ITO, and the gate insulating film 240 is made of SiN (i.e., the refractive index of the drain electrode 222 is similar to that of the gate insulating film 240), the following adverse effect may be caused. As shown in FIG. 23E, when a resist film is formed on portions where the interlayer insulator 234 should be left, and the interlayer insulator 234 is etched under this condition, the contact properties between the drain electrode 222 and the interlayer insulator 234 are different from those between the gate insulating film 240 and the interlayer insulator 234; therefore, an etchant permeates into a boundary region in which the contact properties are poor. Consequently, as shown in FIG. 23F, the interlayer insulator 234 is left on the drain electrode 222; however, the portion (represented by a broken line) which is supposed to be left is removed.

As described above, according to the present invention, the underlying film is formed for the purpose of uniformizing the heat conduction and/or light transmittance between the interlayer insulator and the substrate and/or the contact properties of the interlayer insulator with respect to the substrate in a region where the reflective pixel electrode is formed. Therefore, partial difference in thermal conductivity is prevented in the interlayer insulator. As a result, the upper surface of the interlayer insulator provided on the underlying film can have a desired uneven shape, and the reflective pixel electrode thereon can also have a desired uneven shape, which prevents reflection characteristics from having irregularities. Furthermore, even in the case where a photosensitive material, a non-photosensitive material, etc. is used for the interlayer insulator, and the upper surface of the interlayer insulator is prescribed to be uneven or flat, the performance of the obtained liquid crystal display device is less influenced by nonuniformity of the intensity of UV-light, and the permeation state of a developer between a portion of the interlayer insulator under which the underlying film is present and a portion of the interlayer insulator under which the underlying film is not present. Therefore, the reflective pixel electrode becomes unlikely to subject to variations in shape due to the effect of the underlying film.

Furthermore, in the reflective liquid crystal display device of the present invention, the pixel electrodes are made of metal or the like, and the structure of the underlying portion of the pixel electrodes does not affect a display. Therefore, a defect of the underlying portion of the reflective pixel electrode can be corrected irrespective of a display mode, and a reflective liquid crystal display device can be produced with good mass-production efficiency.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflective liquid crystal display device comprising:
on one of a pair of substrates opposed to each other with a liquid crystal layer interposed therebetween, a plurality of data signal lines for supplying a data signal and a plurality of scanning signal lines for supplying a scanning signal are provided so as to cross each other, a plurality of thin film transistors are provided so as to be electrically connected to the plurality of data signal lines and the plurality of scanning signal lines, a plurality of reflective pixel electrodes are provided on an interlayer insulator formed so as to cover at least a part of the plurality of data signal lines, the plurality of scanning signal lines, or the plurality of thin film transistors, and the plurality of reflective pixel electrodes are electrically connected to corresponding drain electrodes of the plurality of thin film transistors through contact holes provided in the interlayer insulator,
wherein an underlying conductive film, provided under substantially an entire region of the interlayer insulator within reflective pixels, comprises at least a portion of at least one drain electrode and is disposed in contact with the interlayer insulator, the underlying film uniformizing heat conduction and/or light transmittance between the interlayer insulator and the one of the substrates and/or contact properties of the interlayer insulator with respect to the one of the substrates in a region where at least one of the plurality of reflective pixel electrodes is formed.

2. A reflective liquid crystal display device according to claim 1, wherein the underlying film in the given pixel comprises the drain electrode of one of the thin film transistors, and a ratio of an area of the drain electrode to an area of the corresponding reflective pixel electrode is 50% to 95%.

3. A reflective liquid crystal display device according to claim 2, wherein the ration of an area of the drain electrode to an area of the corresponding reflective pixel electrode is 60% to 95%.

4. A reflective liquid crystal display device according to claim 1, wherein the underlying film formed in contact with the interlayer insulator is provided so as to correspond to a shape of the reflective pixel electrode to be formed on the interlayer insulator.

5. A reflective liquid crystal display device according to claim 1, wherein at least part of the underlying film is a part of an electrode forming storage capacitance.

6. The display of claim 1, wherein said drain electrode of one of the transistors is at least partially overlapped by a pixel electrode for the pixel to which the drain electrode corresponds, and said drain electrode at least partially overlaps a data scan line not corresponding to the pixel to which the drain electrode corresponds.

7. The display of claim 1, wherein a ratio of an area of the underlying film to an area of a corresponding pixel electrode for a given pixel is from 50–95%.

8. A reflective liquid crystal display device comprising:
on one of a pair of substrates opposed to each other with a liquid crystal layer interposed therebetween, a plurality of data signal lines for supplying a data signal and a plurality of scanning signal lines for supplying a scanning signal are provided so as to cross each other, a plurality of thin film transistors are provided so as to be electrically connected to the plurality of data signal lines and the plurality of scanning signal lines, a plurality of reflective pixel electrodes are provided on an interlayer insulator formed so as to cover at least a part of the plurality of data signal lines, the plurality of scanning signal lines, or the plurality of thin film transistors, and the plurality of reflective pixel electrodes are electrically connected to corresponding drain electrodes of the plurality of thin film transistors through contact holes provided in the interlayer insulator,
wherein an underlying conductive film comprising at least a portion of at least one drain electrode is disposed in contact with the interlayer insulator, the underlying film uniformizing heat conduction and/or light transmittance between the interlayer insulator and the one of the substrates and/or contact properties of the interlayer insulator with respect to the one of the substrates in a region where at least one of the plurality of reflective pixel electrodes is formed;
wherein the underlying film in the given pixel comprises the drain electrode of one of the thin film transistors,
wherein the drain electrode has a first portion to which a voltage is directly applied from a drain of the thin film transistor, a second portion connected to the first portion and including an electric connecting portion for electrical connection to the reflective pixel electrode via the contact hole, and a third portion to which the voltage is applied via the second portion, and
wherein at least one constricted portion of the drain electrode having a narrow width is provided between the first portion and the second portion and between the second portion and the third portion.

9. A reflective liquid crystal display device according to claim 8, wherein the constricted portions are provided so as to be close to the electric connecting portion.

10. A reflective liquid crystal display device comprising:
on one of a pair of substrates opposed to each other with a liquid crystal layer interposed therebetween, a plurality of data signal lines for supplying a data signal and a plurality of scanning signal lines for supplying a scanning signal are provided so as to cross each other, a plurality of thin film transistors are provided so as to be electrically connected to the plurality of data signal lines and the plurality of scanning signal lines, a plurality of reflective pixel electrodes are provided on an interlayer insulator formed so as to cover at least a part of the plurality of data signal lines, the plurality of scanning signal lines, or the plurality of thin film transistors, and the plurality of reflective pixel electrodes are electrically connected to corresponding drain electrodes of the plurality of thin film transistors through contact holes provided in the interlayer insulator,
wherein an underlying conductive film comprising at least a portion of at least one drain electrode is disposed in contact with the interlayer insulator, the underlying film uniformizing heat conduction and/or light transmittance between the interlayer insulator and the one of the substrates and/or contact properties of the interlayer insulator with respect to the one of the substrates in a region where at least one of the plurality of reflective pixel electrodes is formed;
wherein the underlying film in the given pixel is formed of the drain electrode of one of the thin film transistors and at least one island-shaped thin film electrically insulated from the drain electrode, and a ratio of a total area of the drain electrode and the at least one island shaped thin film to an area of the corresponding reflective pixel electrode is 40% to 90%.

11. A reflective liquid crystal display device according to claim 10, wherein the total area of the drain electrode and the at least one island-shaped thin film to an area of the corresponding reflective pixel electrode is 50% to 90%.

12. A reflective liquid crystal display device according to claim 10, wherein the drain electrode and the at least one island-shaped thin film are made of the same material.

13. A liquid crystal display comprising:
first and second pixels, each of the pixels including a pixel region defined by at least one pixel electrode;
a first address line corresponding to said first pixel, and a second address line approximately parallel to the first address line corresponding to said second pixel;
a transistor for said first pixel, said transistor including a source electrode and a drain electrode, and wherein said drain electrode at least partially overlaps said second address line for said second pixel, wherein a ratio of an area of said drain electrode to an area of said pixel electrode for said first pixel is from 50–95%.

14. The display of claim 13, wherein the pixel electrode is reflective.

15. A reflective liquid crystal display comprising:
first and second substrates;
a liquid crystal layer disposed between said first and second substrates;
at least one thin film transistor corresponding to a pixel provided on one of said substrates;
an interlayer insulating layer disposed on said one substrate at least partially between said transistor and a reflective pixel electrode for said pixel; and
an underlying conductive film disposed in at least a portion of said pixel and formed coplanar with or on a same plane as a drain electrode of the transistor so as to be in contact with said interlayer insulating layer, wherein at least a portion of said underlying conductive film is in electrical communication with said reflective pixel electrode; and
wherein a ratio of an area of said underlying conductive film to an area of said pixel electrode is from 50–95%.

16. An active matrix substrate, comprising:
on one of a pair of substrates opposed to each other with a liquid crystal layer interposed therebetween, a plurality of data signal lines for supplying a data signal and a plurality of scanning signal lines for supplying a scanning signal are provided so as to cross each other, a plurality of thin film transistors are provided so as to be electrically connected to the plurality of data signal lines and the plurality of scanning signal lines, a plurality of reflective pixel electrodes are provided on an interlayer insulator formed so as to cover at least a part of the plurality of data signal lines, the plurality of scanning signal lines, or the plurality of thin film transistors, wherein the plurality of reflective pixel electrodes are electrically connected to corresponding drain electrodes of the plurality of thin film transistors through contact holes provided in the interlayer insulator; and wherein an underlying conductive film comprising at least a portion of at least one drain electrode is disposed in contact with the interlayer insulator in a region where at least one of the plurality of reflective pixel electrodes is formed, the underlying film being formed on the same layer with the same material(s) as the drain electrode, and wherein the area of the underlying film and drain electrode are in a range of 50–95% of the area of the reflective pixel electrode.

17. An active matrix substrate according to claim 16, wherein the underlying film is formed in a shape of an island.

18. An active matrix substrate according to claim 16, wherein the underlying film in the given pixel comprises the drain electrode of one of the thin film transistors;
wherein the drain electrode has a first portion to which a voltage is directly applied from a drain to the thin film transistor, a second portion connected to the first portion and including an electric connecting portion for electrical connection to the reflective pixel electrode via the contact hole, and a third portion to which the voltage is applied via the second portion, and
wherein at least one constricted portion of the drain electrode having a narrow width is provided between the first portion and the second portion and between the second portion and the third portion.

19. An active matrix substrate according to claim 18, wherein the constricted portion(s) is provided so as to be close to the electric connection portion.

20. A liquid crystal display device, comprising an active matrix substrate and a liquid crystal layer, said active matrix substrate comprising:
on one of a pair of substrates opposed to each other with a liquid crystal layer interposed therebetween, a plurality of data signal lines for supplying a data signal and a plurality of scanning signal lines for supplying a scanning signal provided so as to cross each other, a plurality of thin film transistors provided so as to be electrically connected to the plurality of data signal lines and the plurality of scanning signal lines, a plurality of reflective pixel electrodes provided on an interlayer insulator formed so as to cover at least a part of the plurality of data signal lines, the plurality of scanning signal lines, or the plurality of thin film transistors, and the plurality of reflective pixel electrodes being electrically connected to corresponding drain electrodes of the plurality of thin film transistors through contact holes provided in the interlayer insulator, and
wherein an underlying conductive film comprising at least a portion of at least one drain electrode is disposed in contact with the interlayer insulator in a region where at least one of the plurality of reflective pixel electrodes is formed, the underlying film is formed on the same layer with the same material(s) as the electrode, and wherein the area of the underlying film and drain electrode are in a range of 50–95% of the area of the reflective pixel electrode.

* * * * *